(12) United States Patent
Kelly et al.

(10) Patent No.: US 11,783,727 B1
(45) Date of Patent: Oct. 10, 2023

(54) LESSON-BASED VIRTUAL REALITY WELDING TRAINING SYSTEM

(71) Applicants: Mary E. Kelly, Scottsdale, AZ (US); Christopher Schuler, Skiatook, OK (US)

(72) Inventors: Mary E. Kelly, Scottsdale, AZ (US); Christopher Schuler, Skiatook, OK (US)

(73) Assignee: Ocuweld Holdings LLC, Phoenix, AZ (US)

( * ) Notice: Subject to any disclaimer, the term of this patent is extended or adjusted under 35 U.S.C. 154(b) by 0 days.

(21) Appl. No.: 17/859,604

(22) Filed: Jul. 7, 2022

Related U.S. Application Data

(60) Provisional application No. 63/333,610, filed on Apr. 22, 2022, provisional application No. 63/244,084, filed on Sep. 14, 2021.

(51) Int. Cl.
*G09B 19/24* (2006.01)
*G09B 9/00* (2006.01)
*G06F 3/01* (2006.01)
*G06F 3/0482* (2013.01)

(52) U.S. Cl.
CPC ............... *G09B 19/24* (2013.01); *G06F 3/011* (2013.01); *G06F 3/016* (2013.01); *G09B 9/00* (2013.01); *G06F 3/0482* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS

| | | | |
|---|---|---|---|
| 8,834,168 B2 | 9/2014 | Peters | |
| 9,483,959 B2* | 11/2016 | Wallace | ............ G09B 9/00 |
| 9,672,757 B2 | 6/2017 | Becker | |
| 9,836,987 B2 | 12/2017 | Postlethwaite | |
| 10,083,627 B2 | 9/2018 | Daniel | |
| 10,643,496 B2 | 5/2020 | Wallace | |
| 10,762,802 B2 | 9/2020 | Wallace | |

(Continued)

OTHER PUBLICATIONS

Skillveri, Immersive XR Welding Simulation on Oculus Rift/RiftS/Quest with machine settings, https://www.youtube.com/watch?v=2POLUu6iXEo, last accessed on Apr. 24, 2023.

*Primary Examiner* — Robert J Utama
(74) *Attorney, Agent, or Firm* — Phillips Lytle LLP; David L. Principe

(57) ABSTRACT

Systems and methods for lesson-based virtual reality (VR) welding training are provided. Broadly, the system creates a configurable, three-dimensional, virtual reality training environment displayed on a VR display. Using a handheld controller associated with the VR display, a student may select a welding lesson. The welding lessons correspond to a variety of different settings, such as welding process type, workpiece type, workpiece position, finishing tool type, guidance mode, and welding machine settings. The student then creates a weld on the workpiece via the handheld controller, and the system provides real-time feedback, such as audio, visual, and/or haptic, to the student. Once the student has completed the weld, the system generates and displays an assessment of the weld.

31 Claims, 16 Drawing Sheets

(56) References Cited

U.S. PATENT DOCUMENTS

| | | | |
|---|---|---|---|
| 11,450,233 B2* | 9/2022 | Becker | B23K 9/16 |
| 2010/0062406 A1* | 3/2010 | Zboray | G09B 19/00 |
| | | | 434/234 |
| 2013/0183645 A1* | 7/2013 | Wallace | B23K 9/00 |
| | | | 434/234 |
| 2013/0209976 A1* | 8/2013 | Postlethwaite | G09B 19/24 |
| | | | 434/234 |
| 2015/0194073 A1* | 7/2015 | Becker | G09B 19/24 |
| | | | 434/234 |
| 2015/0234952 A1* | 8/2015 | Kruse | G09B 19/003 |
| | | | 703/7 |
| 2018/0241750 A1* | 8/2018 | Serban | H04L 63/10 |
| 2019/0325779 A1* | 10/2019 | Meess | G09B 19/00 |

* cited by examiner

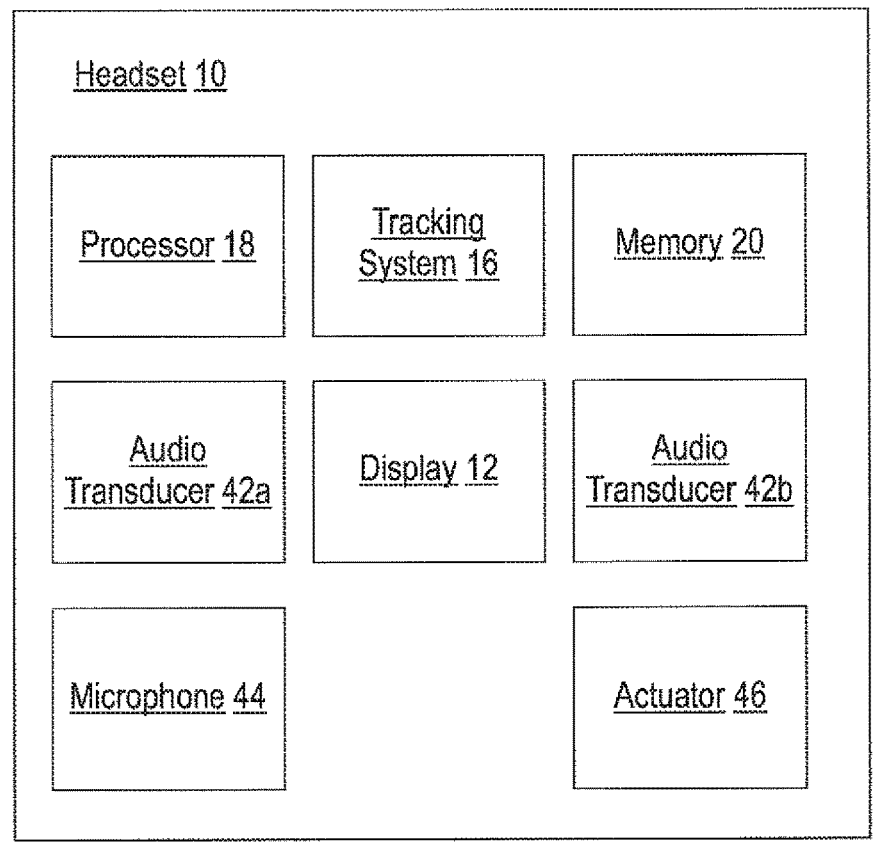
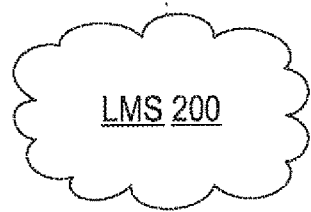
Fig. 2

LESSON-BASED VIRTUAL REALITY WELDING TRAINING SYSTEM

FIELD OF THE DISCLOSURE

The present disclosure is directed generally to a lesson-based virtual reality (VR) welding training system.

BACKGROUND

Welding training is traditionally offered in live, in-person classes. During these classes, a trained instructor guides students through use of the complicated, expensive, and potentially dangerous equipment associated with welding. The hands-on training gained during these classes is crucial to learning the skills associated with welding.

SUMMARY OF THE DISCLOSURE

The present disclosure is generally directed to systems and methods for a lesson-based virtual reality (VR) welding training system to be used as a pre-requisite or supplement to hands-on welding training or for graded homework as part of a welding training course. Broadly, the system creates a configurable, three-dimensional, virtual reality training environment displayed on a VR display. Using a handheld controller associated with the VR display, a student may select a welding lesson. The welding lessons correspond to a variety of different aspects, such as welding process type, workpiece type, workpiece position, finishing tool type, guidance mode, and welding machine settings. The student then creates a weld on the workpiece via the handheld controller, and the system provides real-time feedback (audio, visual, and/or haptic) to the student. Once the student has completed the weld, the system generates and displays an assessment of the weld.

Generally, in one aspect, a VR welding training system is provided. The VR welding training system includes a VR display. The VR welding training system further includes a handheld controller. The VR welding training system further includes a VR tracking system. According to an example, the VR tracking system includes a gyroscope and/or an accelerometer.

The VR welding system further includes a processor. The processor is configured to display, via the VR display, a welding training environment. The welding training environment is displayed based on orientation data generated by the VR tracking system.

The processor is further configured to display, via the VR display, one or more selectable lessons. Each selectable lesson corresponds to a welding process type and a workpiece type. According to an example, the workpiece type is one of t-plate, grooved plate, and pipe. According to a further example, the welding process type is one of shielded metal arc welding (SMAW), tungsten inert gas (TIG), and metal inert gas (MIG).

According to an example, each selectable lesson further comprises a workpiece position type. The workpiece position type is one of flat, horizontal, vertical, overhead, forty-five degree, and diagonal. The workpiece is displayed according to the workpiece position type corresponding to the lesson selection input.

The processor is further configured to receive, via the handheld controller, a lesson selection input. The lesson selection input corresponds to one of the one or more selectable lessons.

The processor is further configured to display, via the VR display, a welding torch and a workpiece in the welding training environment. The welding torch and the workpiece correspond to the lesson selection input.

The processor is further configured to receive, via the handheld controller, a welding torch engagement input. The welding torch engagement input corresponds to the welding torch displayed in the welding training environment.

The processor is further configured to receive, via the handheld controller, a plurality of welding application inputs. The plurality of welding application inputs correspond to the welding torch and the workpiece.

The processor is further configured to display, via the VR display, a weld on the workpiece. The weld corresponds to the plurality of welding application inputs. According to an example, the processor is further configured to provide, via the handheld controller, haptic feedback. The haptic feedback is based on the plurality of welding application inputs and the workpiece.

The processor is further configured to generate a welding assessment. The welding assessment is based on the weld and one or more welding assessment criteria.

The processor is further configured to display, via the VR display, visual welding feedback based on the welding assessment criteria.

According to an example, the processor is further configured to display, via the VR display, a finishing tool in the welding training environment. The finishing tool corresponds to the lesson selection input. The processor is further configured to receive, via the handheld controller, a finishing tool engagement input. The finished tool engagement input corresponds to the finishing tool displayed in the welding training environment. The processor is further configured to receive, via the handheld controller, a plurality of finishing inputs. The plurality of finishing inputs correspond to the finishing tool and the weld. The processor is further configured to display, via the VR display, a finished weld on the workpiece. The finished weld corresponds to the plurality of finishing inputs. According to a further example, the processor is further configured to provide, via the handheld controller, haptic feedback. The haptic feedback is based on the plurality of finishing inputs and the weld. According to another example, the finishing tool is one of an angle grinder, angle grinder with braided wire, and angle grinder with abrasive attachment. According to an even further example, the finishing tool is a slag removal tool.

According to an example, the processor is further configured to display, via the VR display, one or more guidance modes. The processor is further configured to receive, via the handheld controller, a guidance mode selection input. The guidance mode selection input corresponds to one of the one or more guidance modes. According to a further example, the guidance modes include at least one of guided, semi-guided, and unguided. According to another example, the processor is further configured to display one or more guidance instructions. The one or more guidance instructions are displayed based on the lesson selection input and the guidance selection input. According to an even further example, the processor is further configured to display a guidance animation. The guidance animation is displayed based on the lesson selection input and the guidance selection input.

According to an example, the processor is further configured to generate a real-time feedback. The real-time feedback is based on the plurality of welding application inputs and one or more real-time assessment criteria. The real-time feedback may be audio-visual. The real-time assessment criteria may include at least one of speed and arc length.

According to an example, the processor is further configured to determine one or more welding machine settings. The one or more welding machine settings are determined based on the lesson selection input. The processor is further configured to display, via the VR display, at least one of the one or more welding machine settings. According to an example, the weld further corresponds to the one or more welding machine settings. The one or more welding machine settings may include at least one of wire speed, voltage, and current.

According to an example, the processor is further configured to receive, via the handheld controller, a welding machine setting input. The processor is further configured to update, via the processor, at least one of the one or more welding machine settings based on the welding machine input. The at least one of the one or more welding machine settings may be displayed on a welding machine.

According to an example, the processor is further configured to provide credentials to a learning management system (LMS). The processor may be further configured to receive the credentials via the handheld controller and/or a microphone. The processor may be further configured to retrieve the credentials from a memory. The processor may be further configured to retrieve the one or more selectable lessons from the LMS based on the credentials. The processor may be further configured to transmit the welding assessment to the LMS. The transmitted welding assessment may be associated with the credentials.

Generally, in another aspect, a method for providing VR welding training is provided. The method includes displaying, via a VR display, a welding training environment based on orientation data generated by a VR tracking system. The method further includes displaying, via the VR display, one or more selectable lessons, wherein each selectable lesson corresponds to a welding process type and a workpiece type. The method further includes receiving, via a handheld controller, a lesson selection input corresponding to one of the one or more selectable lessons. The method further includes displaying, via the VR display, a welding torch and a workpiece in the welding training environment, wherein the welding torch and the workpiece correspond to the lesson selection input. The method further includes receiving, via the handheld controller, a welding torch engagement input corresponding to the welding torch displayed in the welding training environment. The method further includes receiving, via the handheld controller, a plurality of welding application inputs corresponding to the welding torch and the workpiece. The method further includes displaying, via the VR display, a weld on the workpiece, wherein the weld corresponds to the plurality of welding application inputs. The method further includes generating, via a processor, a welding assessment based on the weld and one or more welding assessment criteria. The method further includes displaying, via the VR display, visual welding feedback based on the welding assessment criteria.

In various implementations, a processor or controller may be associated with one or more storage media (generically referred to herein as "memory," e.g., volatile and non-volatile computer memory such as RAM, PROM, EPROM, EEPROM, floppy disks, compact disks, optical disks, magnetic tape, etc.), In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 2 is a schematic of a VR welding training system, in accordance with an example.

DETAILED DESCRIPTION OF EMBODIMENTS

The present disclosure is generally directed to systems and methods for a lesson-based virtual reality (VR) welding training system. Broadly, the system creates a configurable, three-dimensional, VR training environment displayed on a VR display. Using a handheld controller associated with the VR display, a student may select a welding lesson. The welding lessons correspond to a variety of different settings, such as welding process type, workpiece type, workpiece position, finishing tool type, guidance mode, and welding machine settings. The student then creates a weld on the workpiece via the handheld controller, and the system provides real-time feedback (audio, visual, and/or haptic) to the student. Once the student has completed the weld, the system generates and displays an assessment of the weld.

Figure 1:
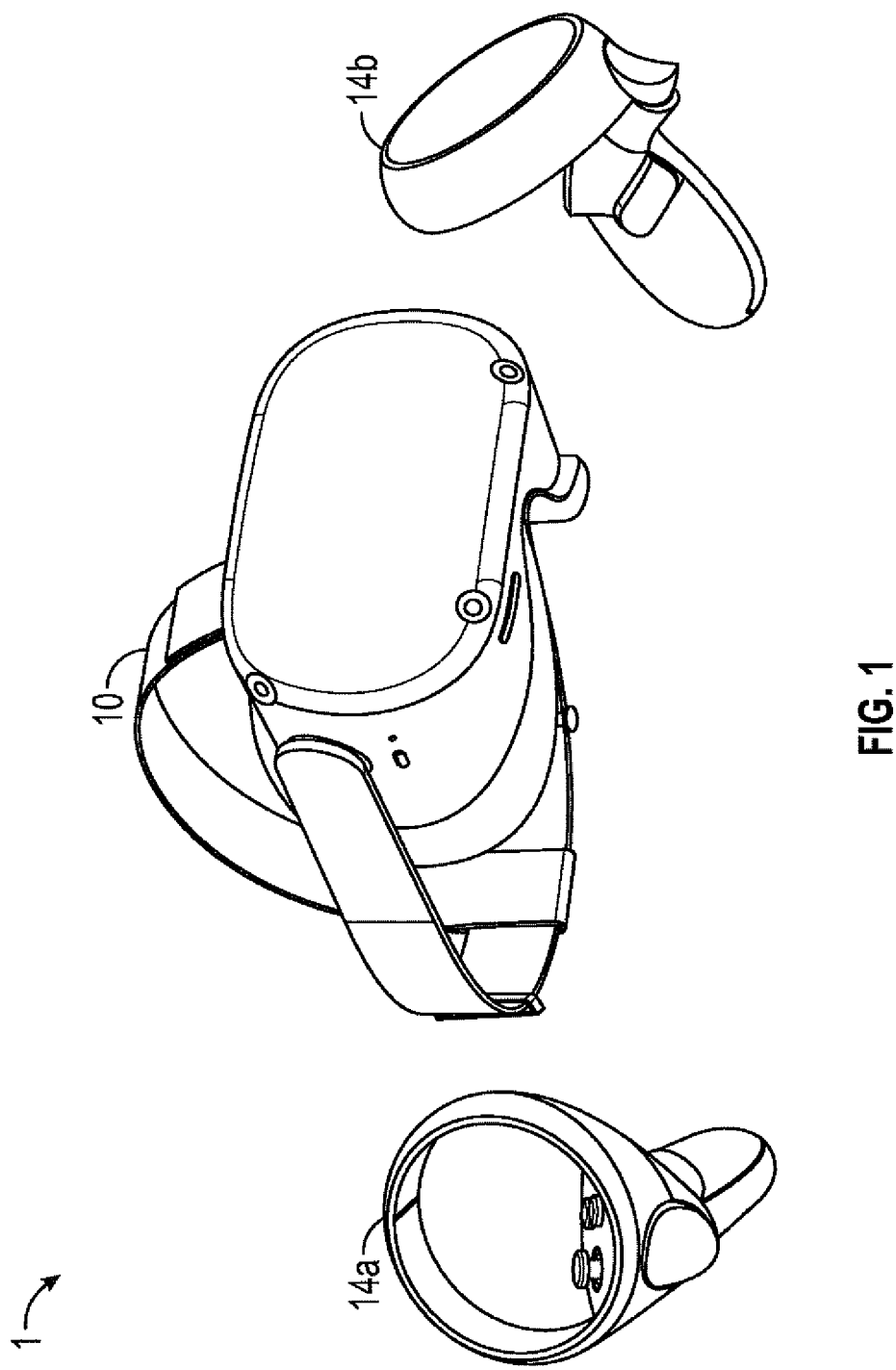
FIG. 1 is a photograph of a virtual reality (VR) headset and a pair of handheld controllers, in accordance with an example.

A student interacts with the virtual aspects of the system through a VR platform, such as the Oculus Rift® system (though other VR platforms may be used). Aspects of a VR welding training system 1 are shown in the illustration of FIG. 1 and the schematic of FIG. 2. The system 1 includes a headset 10 worn by the student. The headset 10 includes a VR display 12 worn in front of the student's eyes, and one or more audio transducers 42a, 42b to provide the student with audio output from the system 1. The headset 10 also includes a tracking system 16 to determine the direction of the student's gaze. The tracking system 16 may include gyroscopes and/or accelerometers configured to track the movements of the student's head. In further examples, the tracking system 16 may include cameras and/or other devices configured to follow the line-of-sight of the student's eyes, even while their head remains stationary. The tracking system 16 generates orientation data 22 (see FIG. 15) used to configure a welding training environment 100 (see FIGS. 3-14) displayed by the VR display 12. The headset 10 may include additional input and output devices, such as microphones 44 for capturing voice commands and/or actuators 46 for providing haptic feedback 28. The headset 10 also includes a processor 18 for executing various aspects of training software 52, allowing the student to interact with the welding training environment 100. The headset 10 also includes a memory 20 for storing data collected by and/or generated by the various aspects of the headset 10.

The VR welding training system 1 also includes at least one handheld controller 14a. The student uses the handheld controller 14a to interact with the welding training environment 100 by performing tasks such as selecting menu options, engaging with tools, and applying a weld. The handheld controller 14a may be ergonomically shaped to conform to the student's hands. The handheld controller 14a includes a controller tracking system 48a to translate the movements of the handheld controller 14a to movements within the virtual welding environment 100. The controller tracking system 48a can include gyroscopes and/or accelerometers configured to track the movements of the handheld controller 14a. The handheld controller 14a also includes one or more buttons 50a used to capture user input. In one example, one of the buttons 50a is configured as a trigger button. The trigger button is positioned on the handheld controller 14a where a student's index (or trigger) finger would typically rest when holding the handheld controller 14a. The handheld controller 14a may include additional buttons 50a arranged such that the student may depress the buttons using the same hand that is holding the handheld controller 14a. The handheld controller 14a may also include one or more actuators 56a to provide haptic feedback 28 to the user.

The handheld controller 14a is in communication with various aspects of the headset 10, such as the processor 18 and/or the memory 20. While the handheld controller 14a is typically in wireless communication with the headset, the communication between the handheld controller 14a and the headset 10 may be facilitated by any combination of wireless and/or wired connection. For example, the handheld controller 14a may wirelessly convey data related to one or more user inputs to the memory 20 and/or processor 18 of the headset 10. Similarly, the processor 18 of the headset 10 may wirelessly command the actuation of the actuator 56a of the handheld controller 14a to provide haptic feedback 28 to the user.

In some examples, the VR welding training system 1 includes a second handheld controller 14b. The second handheld controller 14b may include the same features and functionality as the first handheld controller 14a. In one example, the first handheld controller 14a is designed to be operated by the right hand of the student, while the second handheld controller 14b is designed to be operated by the left hand. Using two handheld controllers 14a, 14b simultaneously may be necessary to interact with certain selectable lessons, such as lessons involving tungsten inert gas (TIG) welding. In a lesson involving TIG welding, the student may operate a virtual welding torch with one handheld controller 14a, 14b and a virtual filler rod with the other.

In some examples, aspects of the headset 10, such as the processor 18 or the memory 20, may be in communication with a learning management system (LMS) 200. As will be described below, the LMS 200 may be used to enable features of the virtual welding environment 100, as well as to track the performance and progress of the student. The communication between the handheld controller 14a and the headset 10 may be any combination of wireless and/or wired connection.

Figure 14:
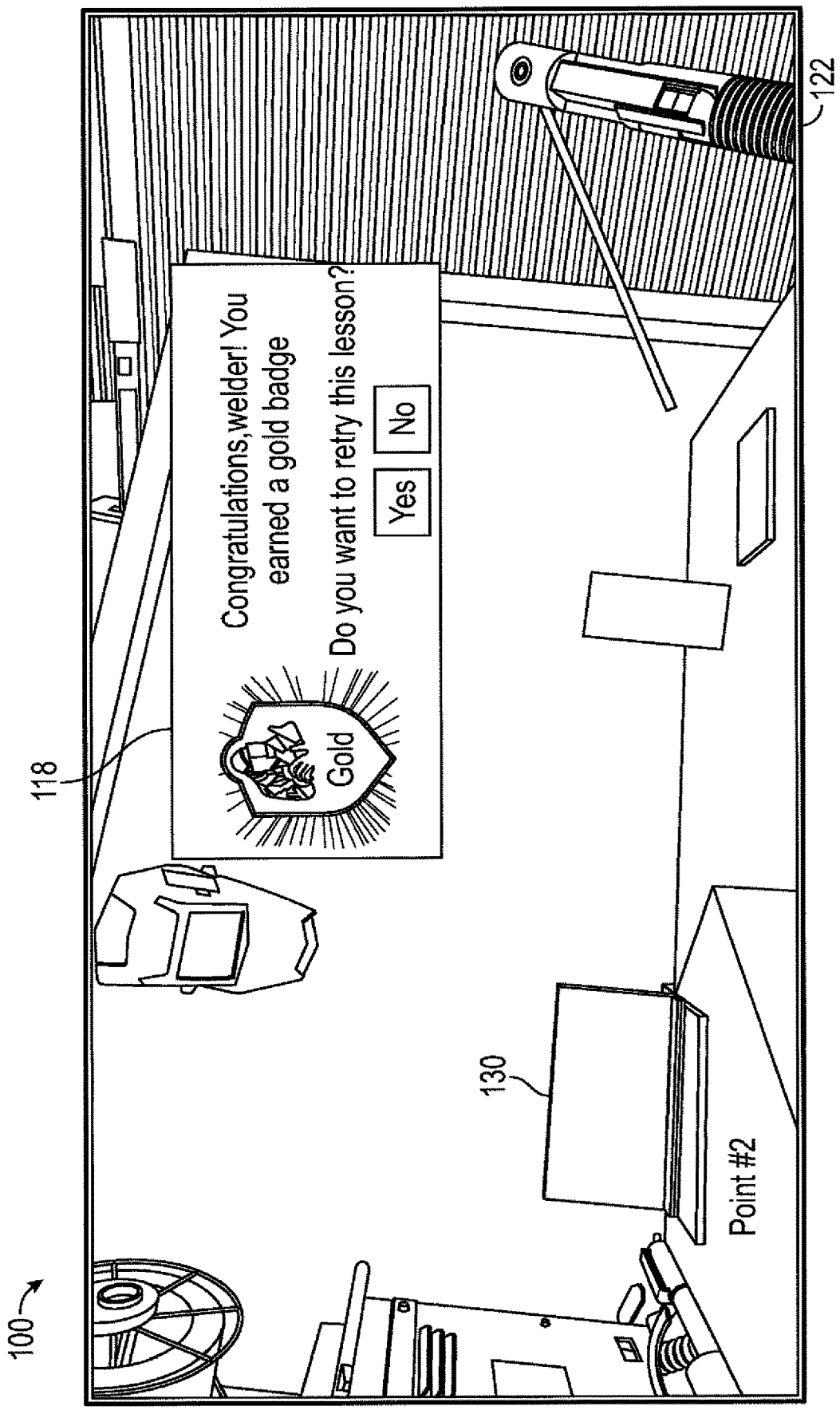
FIG. 14 is a screenshot of a VR display of a welding training environment showing visual welding feedback, in accordance with an example.
Figure 15:
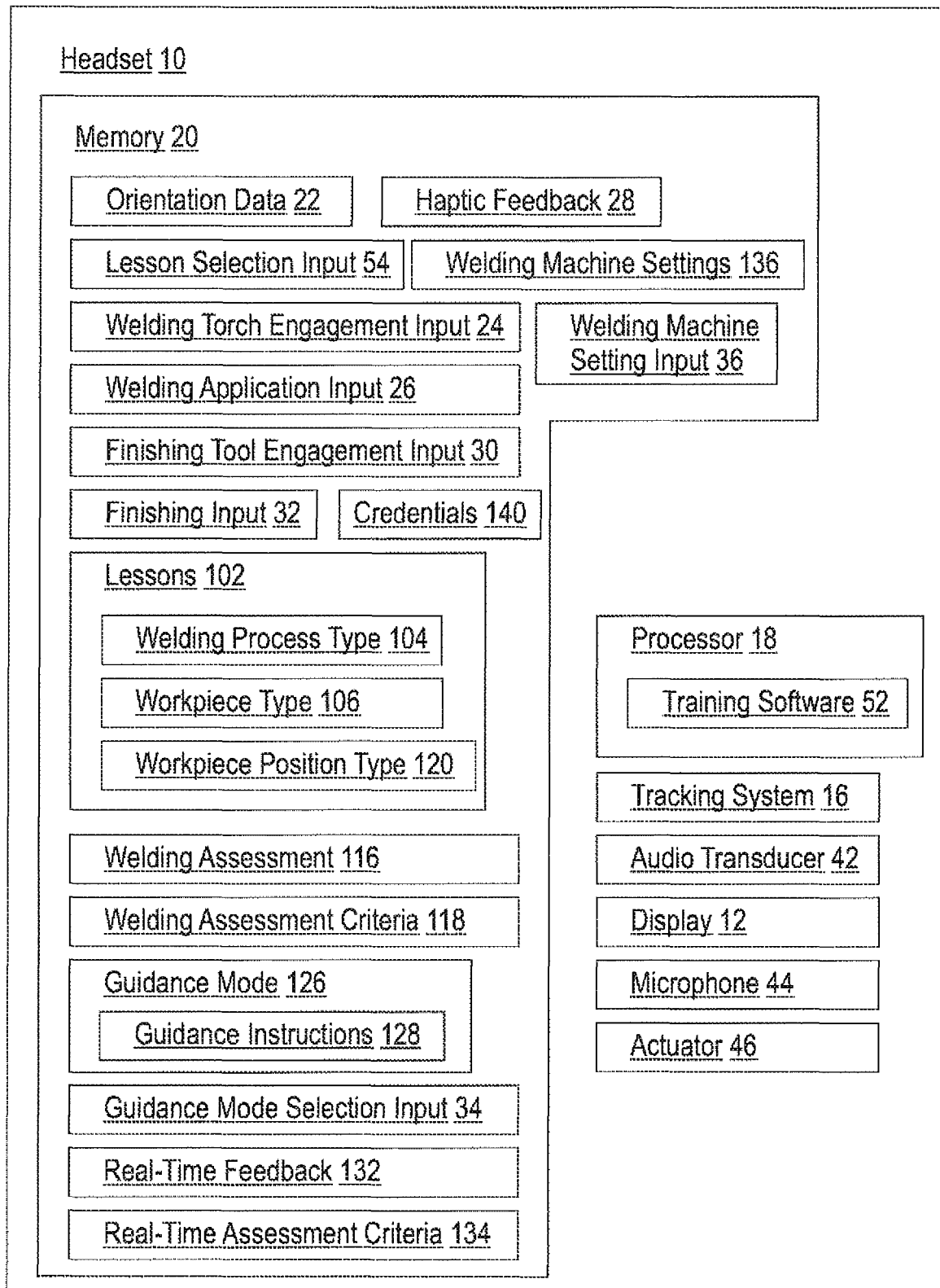
FIG. 15 is a schematic diagram of a headset of a VR welding training system.

A student interacts with the VR welding training system 1 by wearing the headset 10, holding at least one of the handheld controllers 14, and launching training software 52, As shown in FIG. 15, the training software 52 is typically executed by the processor 18 of the headset 10. In other examples, aspects of the training software 52 may be executed by other means, such as via cloud-based computing. Upon launching the training software 52, a welding training environment 100 is generated and displayed via the VR display 12. Example welding training environments 100 are shown in FIGS. 3-14. The welding training environment 100 is a three-dimensional, student-configurable virtual representation of a welding workspace. The welding training environment 100 is displayed on the VR display 12 from a first-person point-of-view.

Figure 3:
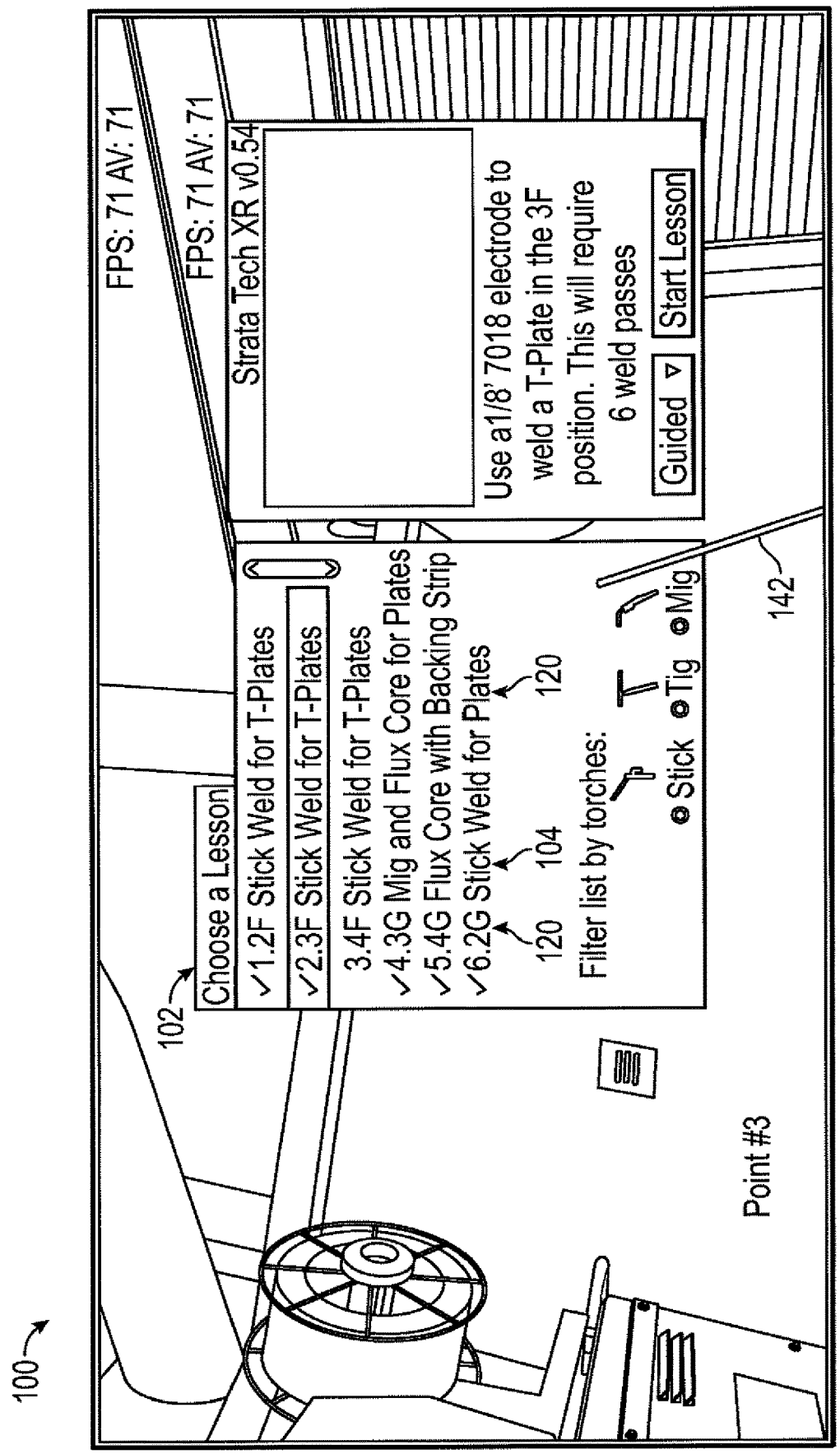
FIG. 3 is a screenshot of a VR display of a welding training environment showing a lesson selection, in accordance with an example.

Following the initial generation of the welding training environment 100, one or more selectable lessons 102 are displayed. An example of the selectable lessons 100 is shown in FIG. 3. Each selectable lesson 102 corresponds to a welding process type 104, workpiece type 106, and workpiece position type 120. The workpiece type 106 may be, according to some non-limiting examples, a plate, a grooved plate, or a pipe. The welding process type 104 may be shielded metal arc welding (SMAW), TIG, or metal inert gas (MIG). The workpiece position type may be, according to some non-limiting examples, flat, horizontal, vertical, overhead, forty-five degree, or diagonal. For example, lesson 1 in FIG. 3, "2F Stick Weld for T-Plates," corresponds to a t-plate workpiece type, an SMAW welding process type, and a horizontal welding position type. Further, lesson 6 in FIG. 3, "2G Stick Weld for Plates" corresponds to plates workpiece types, a stick weld welding processor type, and a vertical welding position type.

As shown in FIG. 3, the selectable lessons 102 may be displayed on a scrolling list. The scrolling list of selectable lessons 102 may be filterable based on welding process type 104 (SMAW, TIG, MIG). While the selectable lessons 102 are displayed, one of the handheld controllers 14 functions as a pointer 142. The student controls the position of the pointer 142 by moving the handheld controller 14 (see FIGS. 1 and 2). The student then chooses a selectable lesson 102 by entering a lesson selection input 54 (see FIG. 15). The lesson selection input 54 may be a combination of moving the handheld controller 14 such that the pointer 142 aligns with a desired selectable lesson 102 and the depression of a button 50*a* on the handheld controller 14. Alternatively, the lesson selection input 54 could be a voice command. In the example of FIG. 3, the student has chosen selectable lesson number 2, "3F Stick Weld for T-Plates," resulting in the welding training environment rendered in FIG. 4.

Figure 4:
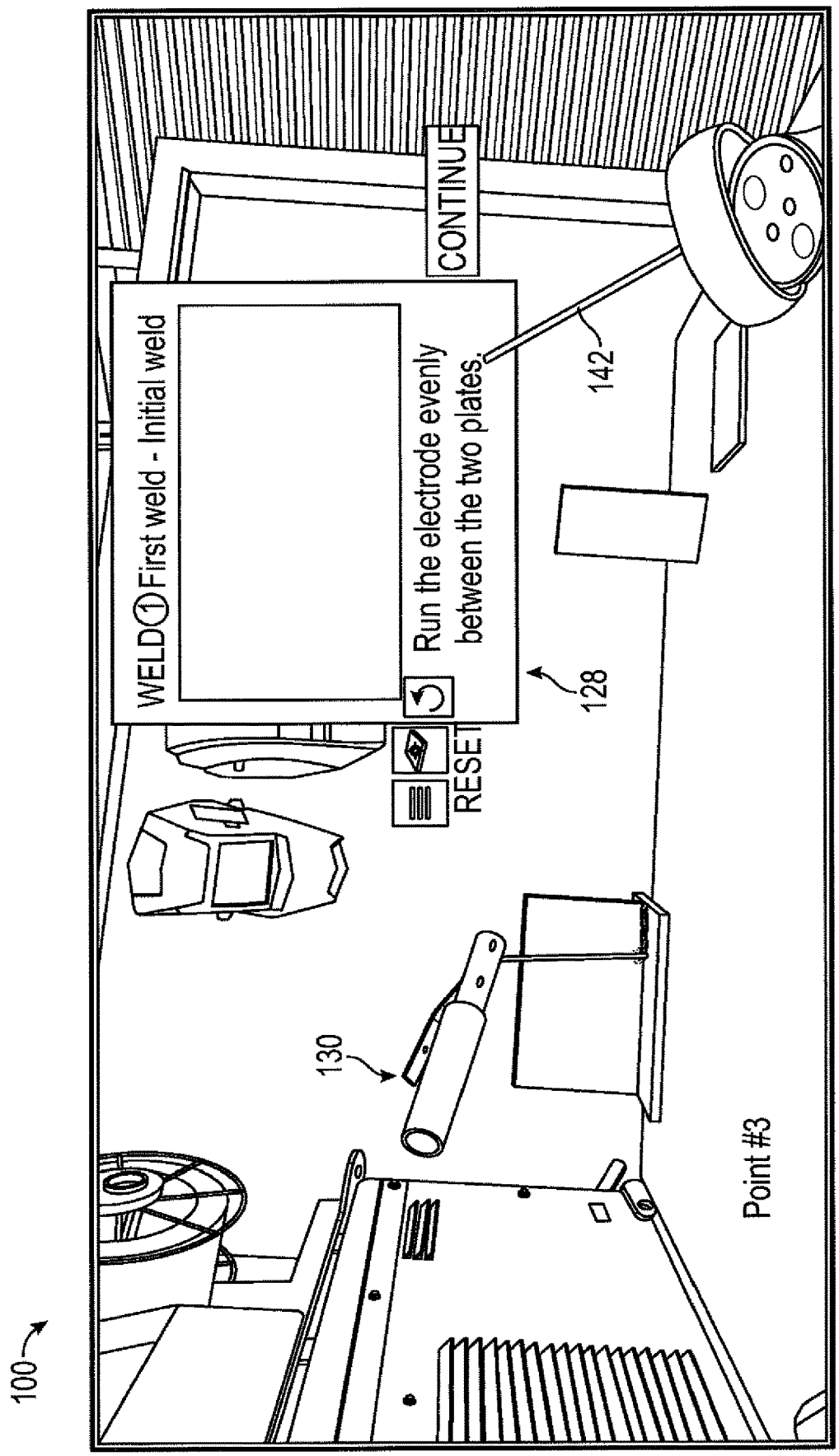
FIG. 4 is a screenshot of a VR display of a welding training environment showing the beginning of a lesson, in accordance with an example.

Once the selectable lesson 102 is chosen, additional details (in the form of text and/or images) are displayed. The student also has the ability to select a guidance mode 126 from a drop-down menu. The guidance modes 126 may be guided, semi-guided, or unguided. The guidance modes 126 determine how much assistance is provided to the student while they apply the weld 114 (see FIG. 9). For example, in guided mode, step-by-step guidance instructions 128 are provided to the student. FIG. 4 shows an example instruction step for the "First weld—Initial weld" for a t-plate, instructing the student to "Run the electrode evenly between the two plates." The subsequent step will display following the student's execution of the current step, or by the user selecting the "CONTINUE" button. In a further example, audio recordings of the guidance instructions 128 may be provided to the user via the acoustic transducers 42*a*, 42*b* (see FIG. 2) of the headset 10.

In a further example, in guided mode and semi-guided mode, a guidance animation is displayed. The guidance animation demonstrates proper execution of the current step to the student. An example guidance mode animation is shown proximate to the back edge of the workbench in FIG. 4.

Figure 5:
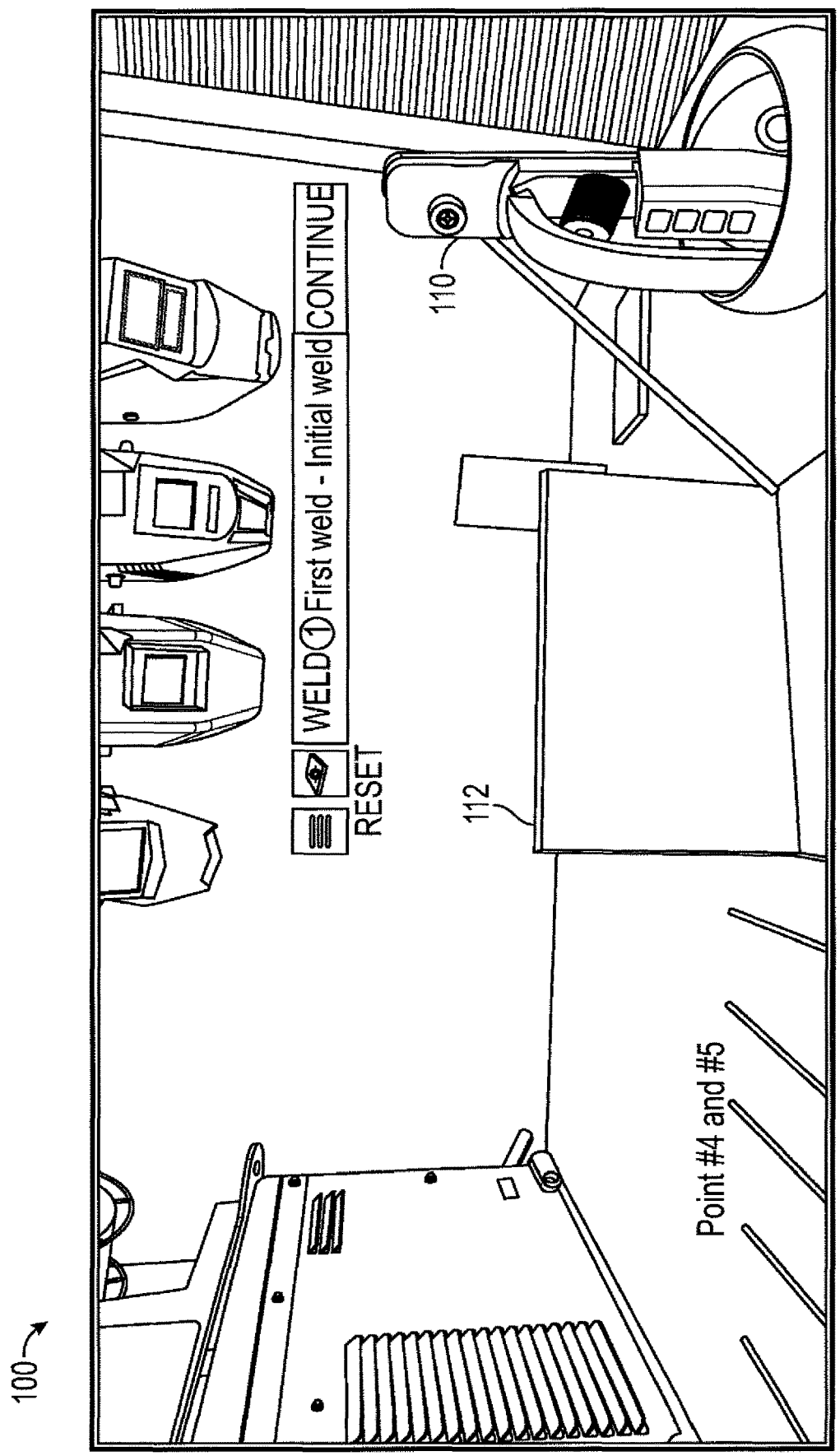
FIG. 5 is a screenshot of a VR display of a welding training environment showing a shielded metal arc welding (SMAW) lesson, in accordance with an example.

Once the selectable lesson 102 is chosen, the welding training environment 100 shown on the VR display 12 displays the welding torch 110 and workpiece 112 corresponding to the lesson 102. Further, the welding training environment 100 orients the workpiece 112 according to the selected lesson 102. FIG. 5 shows an example where the student has selected the "2F Stick Weld for T-Plates" lesson shown in FIG. 3. FIG. 5 shows a workpiece 112 (embodied as a t-plate) positioned horizontally, welding torch 110 (embodied as an SMAW torch), and an array of five electrodes laying on the workbench. The student may enter a welding torch engagement input 24 (FIG. 15) to begin manipulating the welding torch 110. The welding torch engagement input 24 may simply be moving the handheld controller 14 (displayed in the welding training environment 100) such that the controller 14 overlaps the welding torch 110. The welding torch engagement input 24 may also include depressing one or more of the buttons 50 of the handheld controller 14 (see FIG. 2). The student may disengage the welding torch 110 from the handheld controller 14 by positioning the welding torch 110 on the workbench and/or depressing one or more of the buttons 50*a* of the handheld controller 14.

Similarly, the student may engage with the workpiece 112 in a similar manner as the welding torch 110. Once engaged, the student may manipulate the workpiece 112 through translation (on the workbench) and/or rotation. The student may also manipulate other aspects of the welding training environment 110, such as the height of the workbench.

In a further example, the student can use a second handheld controller 14*b* (see FIG. 2) to manipulate a complementary aspect of the welding torch 110. For example, as shown in FIG. 5, an array of five electrodes are laying on the workbench, and one electrode is currently attached to the welding torch 110 (embodied as an SMAW torch). The student may use the second handheld controller 14*b* to remove the attached electrode, place it on the workbench, engage a different electrode, and attach it to the welding torch 110.

Figure 6:
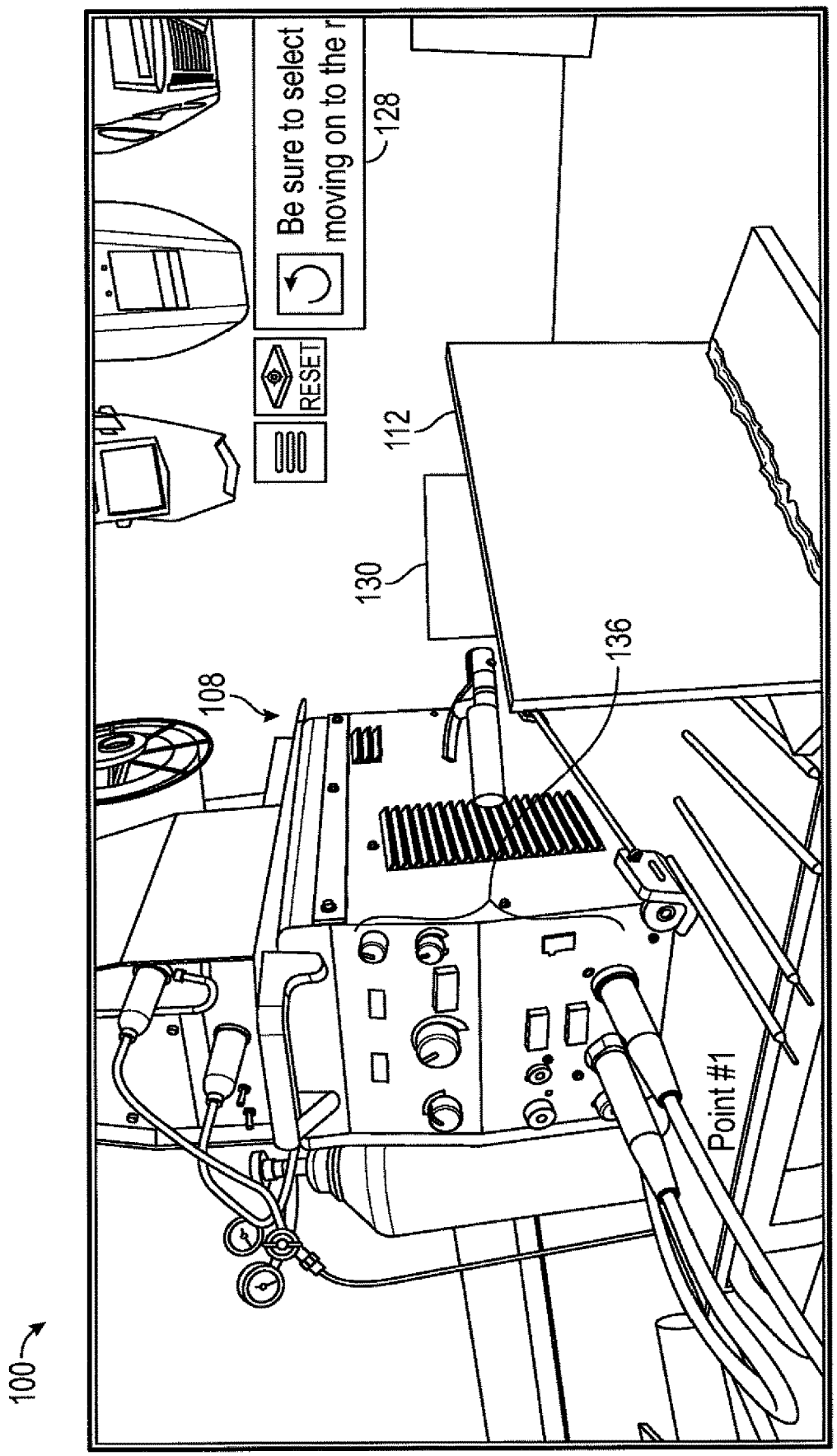
FIG. 6 is a screenshot of a VR display of a welding training environment showing a configurable welding machine, in accordance with an example.

Further, as shown in FIG. 6, the welding training environment 100 can display a welding machine 108 with one or more programmable welding machine settings 136, such as voltage or current. The welding machine 108 may also have a programmable welding machine setting 136 for wire speed when the student has chosen a lesson involving a MIG welding process. The student may select one of these welding machine settings 136 by using the handheld controller 14. Once the welding machine setting 136 is selected, the student may adjust the programmable welding machine setting 136 through a variety of means, such as manipulation of the handheld controller 14 (for example by rotating the handheld controller 14 to turn a knob on the welding machine 108, or depressing a button 50*a* on the controller 14 to depress a button on the welding machine 108). The welding machine 108 may then update its display to correspond to the updated welding machine settings 136. The guidance instructions 128 may offer guidance (such as "increase current to 70 A") regarding these settings.

Figure 7:
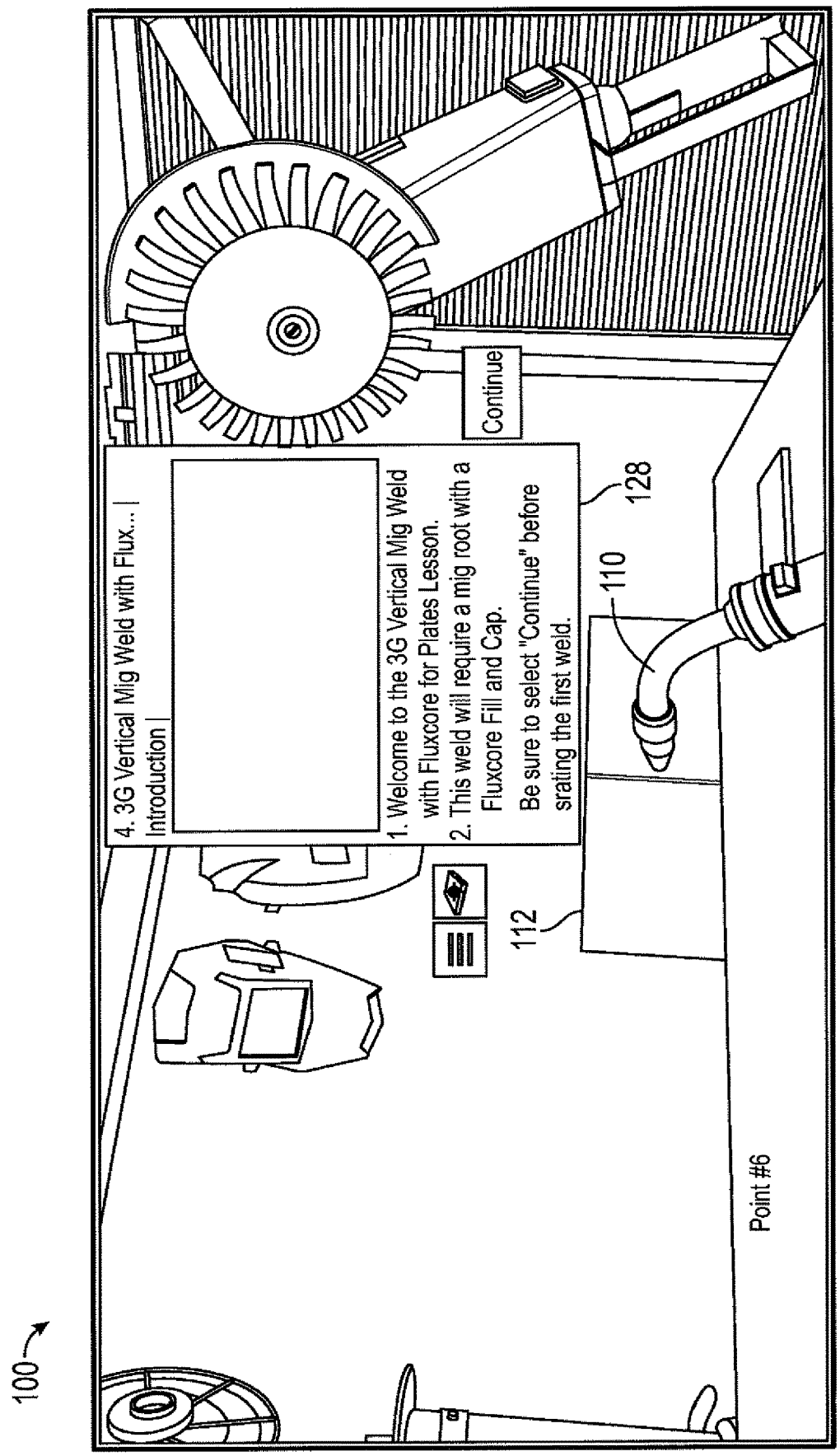
FIG. 7 is a screenshot of a VR display of a welding training environment showing a tungsten inert gas (TIG) lesson, in accordance with an example.
Figure 8:
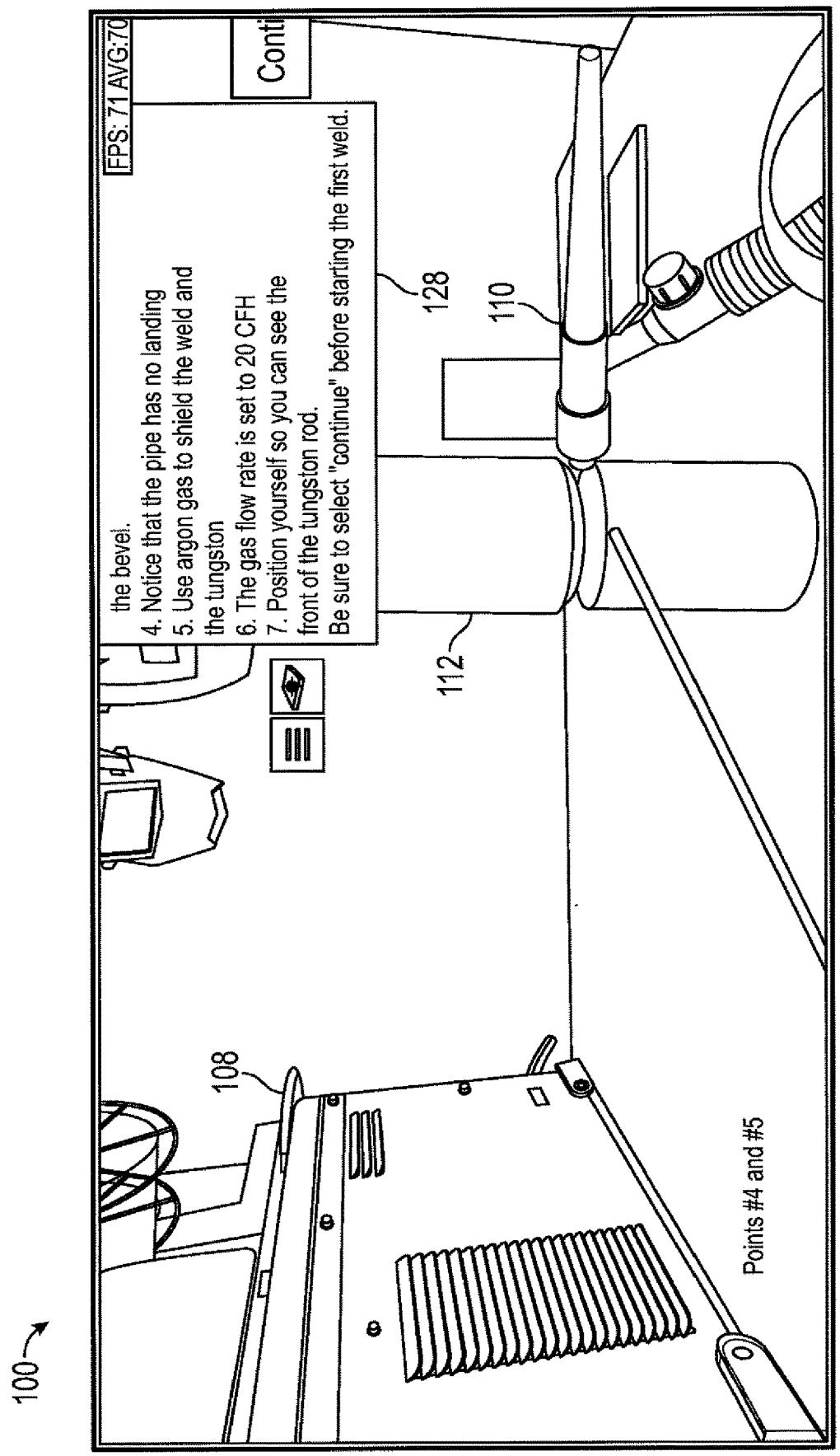
FIG. 8 is a screenshot of a VR display of a welding training environment showing a metal inert gas (MIG) lesson, in accordance with an example.

FIG. 7 illustrates the welding training environment 100 when a MIG lesson is selected. As can be seen in FIG. 7, a MIG torch has replaced the SMAW torch. FIG. 8 illustrates welding training environment 100 when a TIG lesson is selected. As can be seen in FIG. 8, a TIG torch has replaced the SMAW torch, and the student controls a filler rod with a second handheld controller 14*b* (see FIG. 2). In FIG. 8, a weld 114 is being applied to a pipe, rather than a set of plates.

Figure 9:
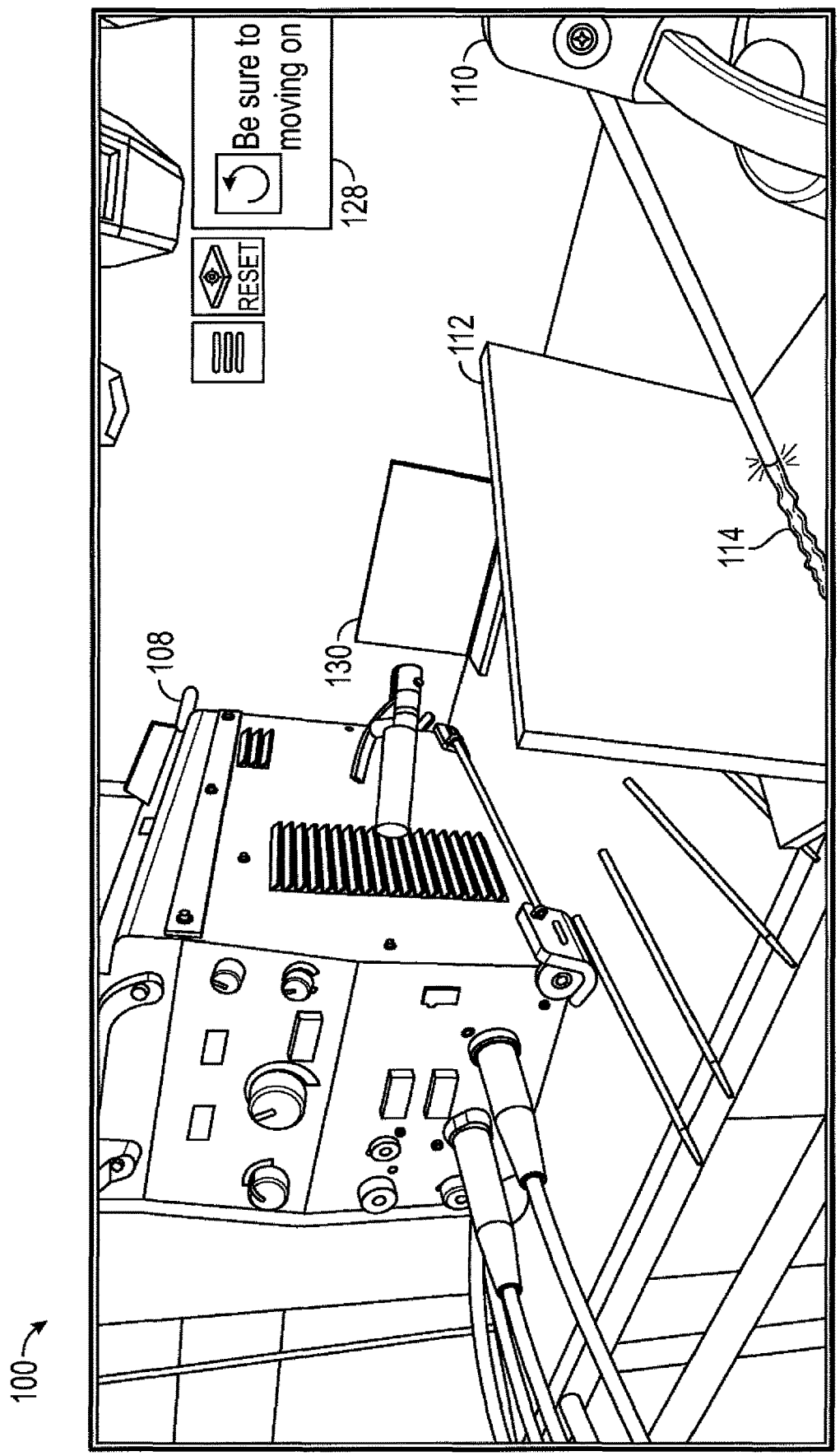
FIG. 9 is a screenshot of a VR display of a welding training environment showing an application of a weld to a t-plate workpiece, in accordance with an example.

Once the student has chosen a selectable lesson 102 and engaged their welding torch 110, the student can begin to apply a weld 114 to the workpiece. FIG. 9 shows a welding torch 114 (embodied as an SMAW torch) applying a weld 114 to a workpiece 112 (embodied as a horizontal t-plate). The weld 114 is applied based on a series of welding application inputs 26. The welding application inputs 26 may be a combination of handheld controller 14 movements and/or controller button 50*a* depressions. The processor 18 (see FIG. 2) of the headset 10 may provide haptic feedback 28 (see FIG. 15) to the handheld controller 14. The haptic feedback 28 corresponds to the application of the weld 114.

Figure 10:
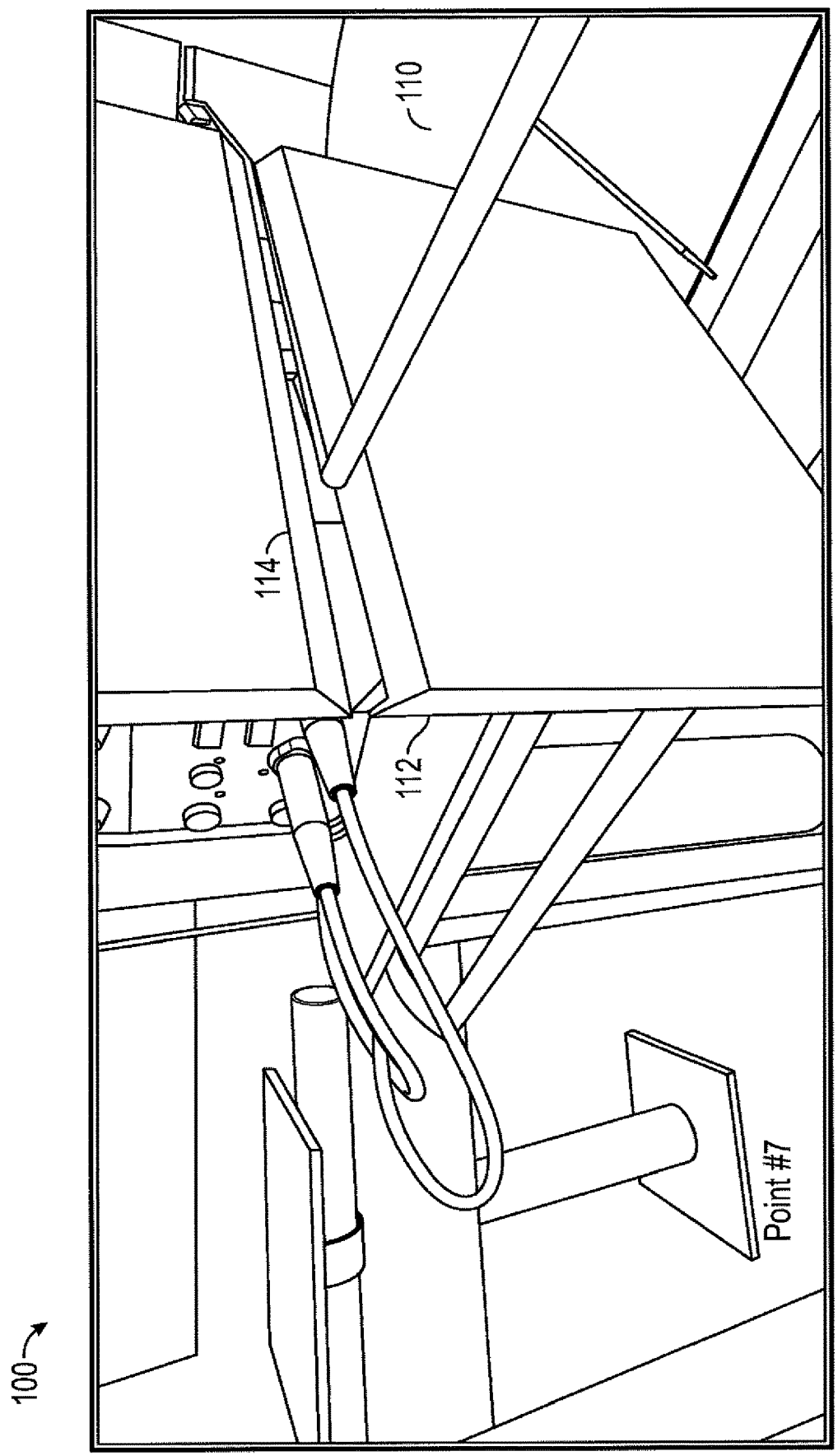
FIG. 10 is a screenshot of a VR display of a welding training environment showing an application of a keyhole weld, in accordance with an example.

FIG. 10 is a demonstration of the application of a weld 114, in particular, a keyhole weld. In this example, the keyhole weld is being applied to a workpiece 112 embodied as two parallel plates separated by a small gap. The student applies the weld 114 using welding torch 110 embodied as an SMAW torch. As can be seen in FIG. 10, the application of the welding torch 110 deforms the plates, increasing the width of the gap, before filling in the widened gap with the weld 114.

Figure 11:
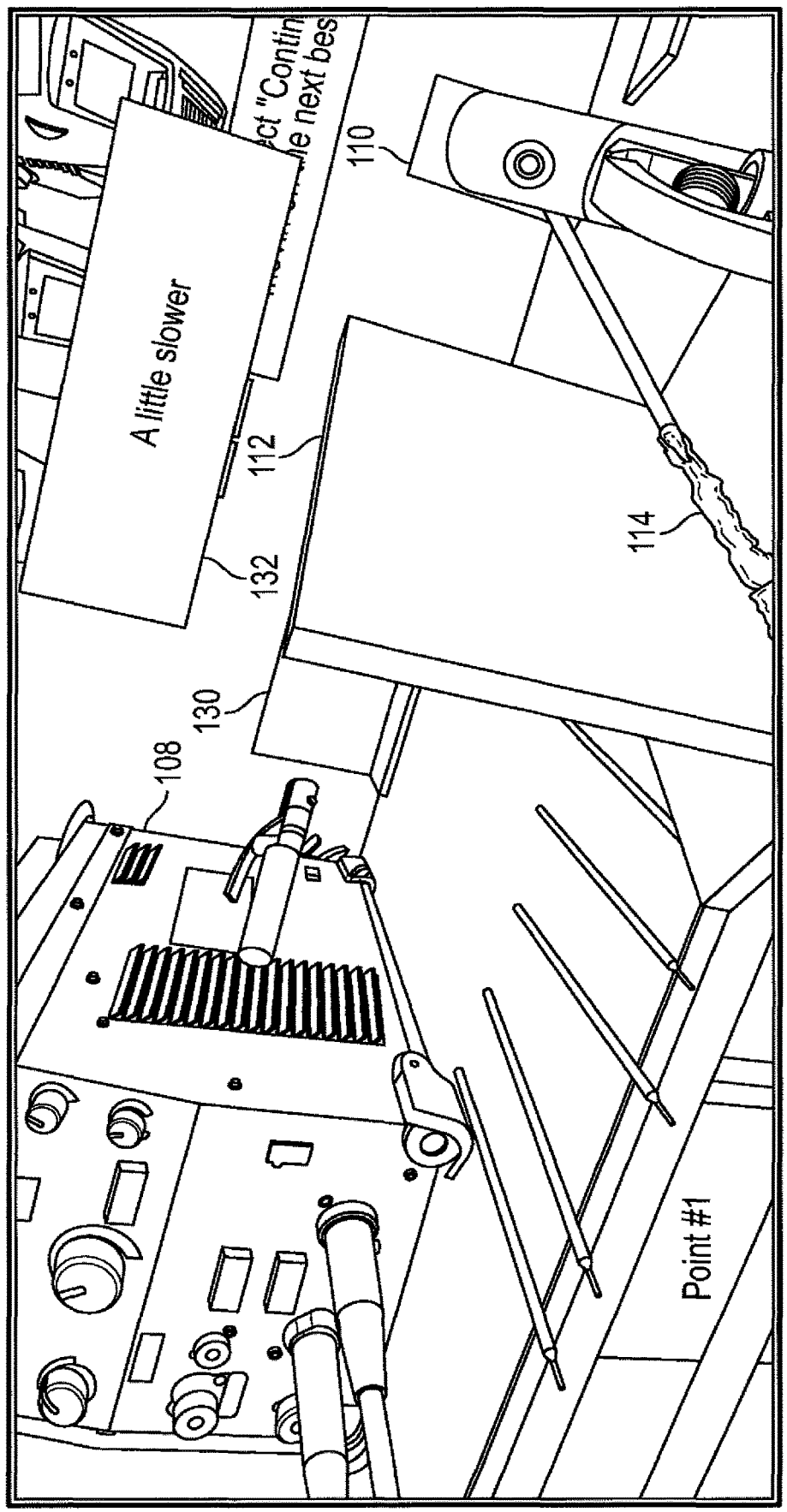
FIG. 11 is a screenshot of a VR display of a welding training environment showing real-time weld feedback, in accordance with an example.

FIG. 11 illustrates real-time feedback 132 generated in response to a weld 114. As can be seen in FIG. 11, the student is applying a weld 114 to a workpiece 112 (embodied as a horizontal t-plate) using a welding torch 110 (embodied as an SMAW torch). However, in this example, the student is applying the weld 114 too fast for the welding process type 104 they have chosen. Accordingly, the system 1 has generated and displayed a real-time feedback 132 message of "A little slower." Similarly, the system 1 may generate real-time feedback 132 if the student is applying the weld 114 too slowly, or if the arc length is too long or short. The system 1 may be configured to arrange the textual real-time feedback 132 in the welding training environment 100 to prevent the real-time feedback 132 from obscuring features of the environment 100. The textual real-time feedback 132 may also be provided to the student via the audio transducers 42a and 42b (see FIG. 2) of the headset 10.

Figure 12:
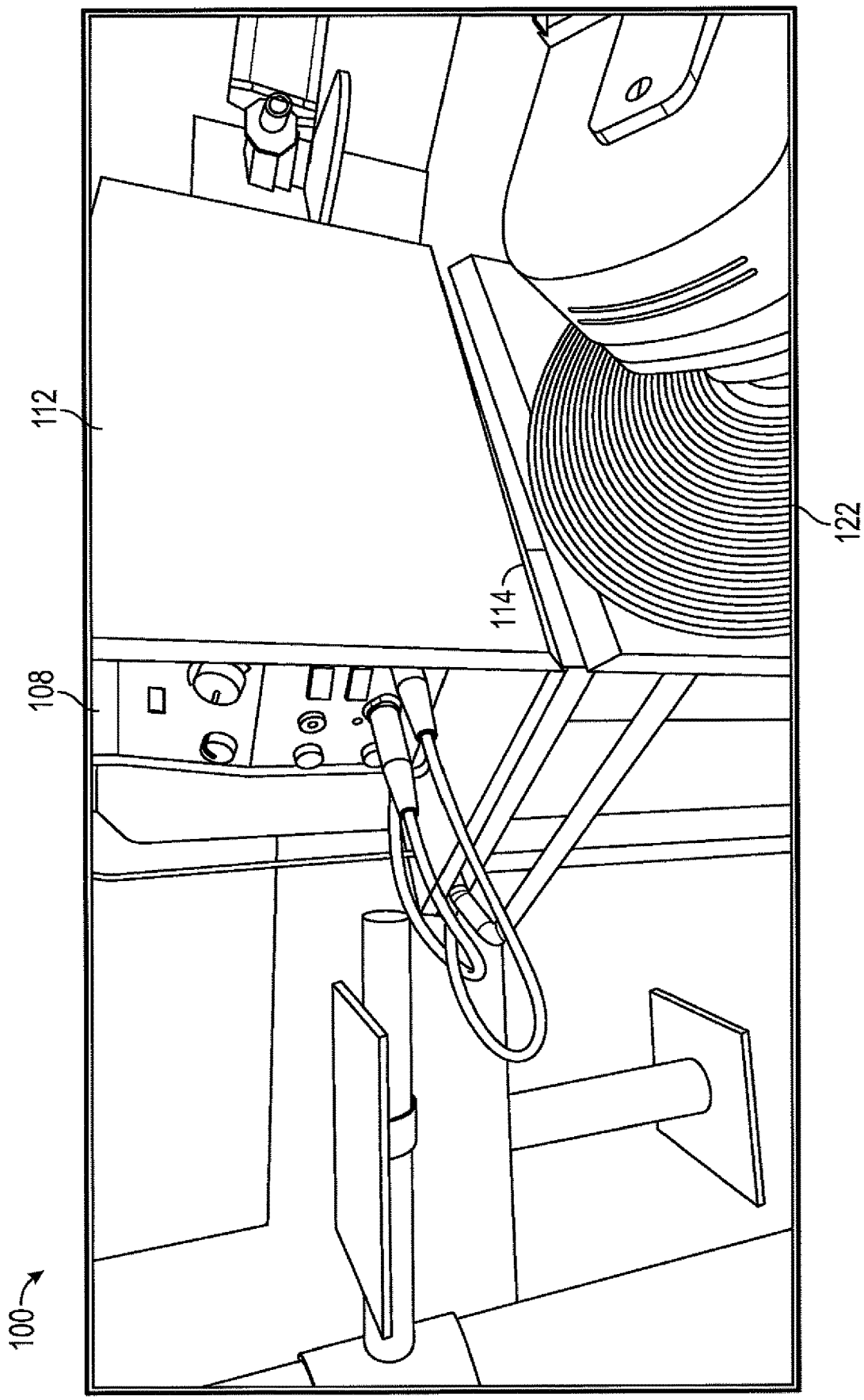
FIG. 12 is a screenshot of a VR display of a welding training environment showing an angle grinder, in accordance with an example.
Figure 13:
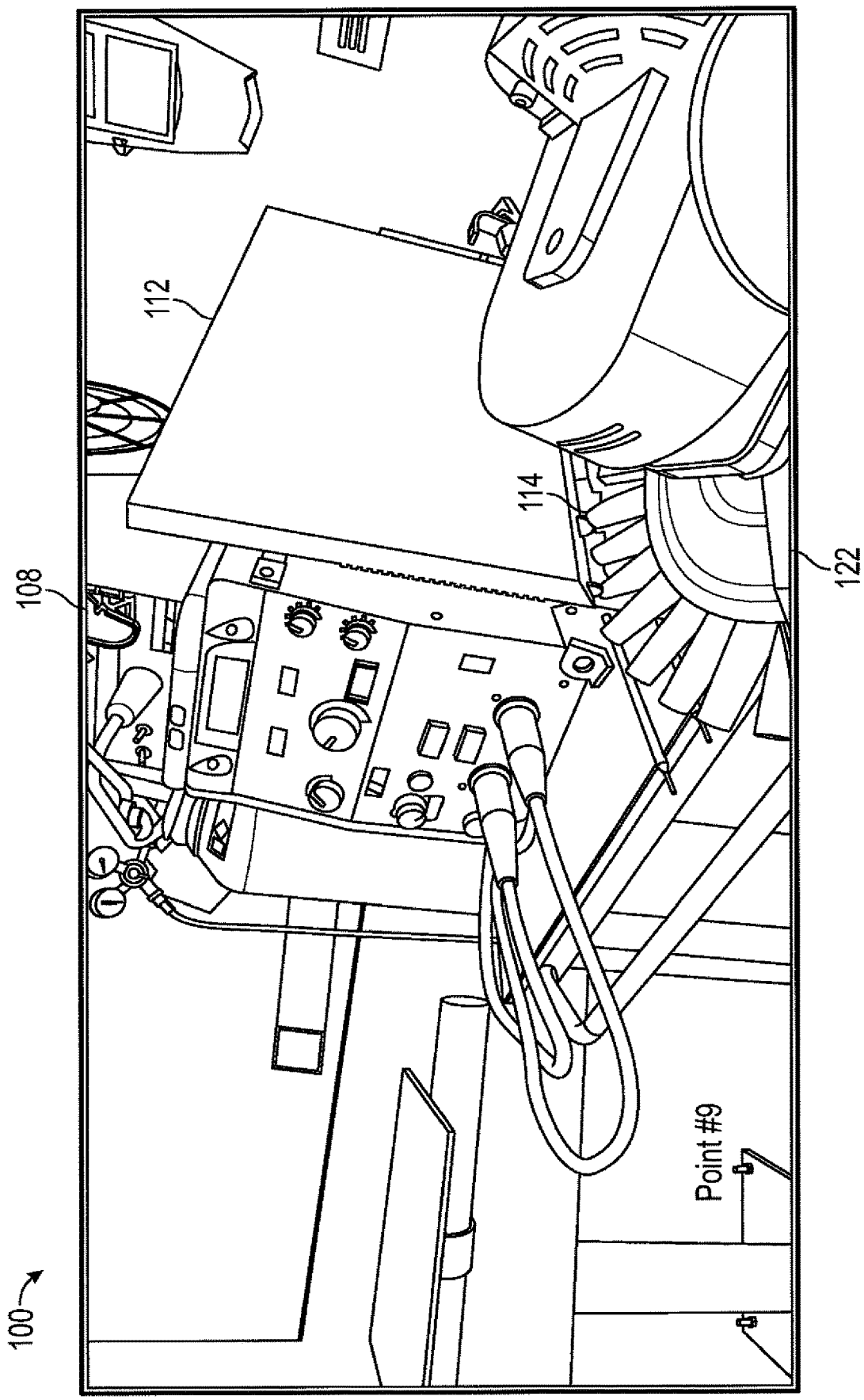
FIG. 13 is a screenshot of a VR display of a welding training environment showing a slag removal tool, in accordance with an example.

Turning to FIGS. 12-13, following the application of the weld 114 (which may require several passes or iterations), the student may use a finishing tool 122 on the weld 114, such as an angle grinder or a slag removal tool. The finishing tool 122 may be selected and manipulated in a similar manner as the welding torch 110. For example, the finishing tool 122 may be selected via a finishing tool engagement input 30 (similar to the welding torch engagement input 24) and applied to a weld 114 via a finishing input 32 (similar to the welding application input 26). FIG. 12 illustrates the student using a finishing tool 122 (embodied as an angle grinder) to grind down weld beads on a weld 114 (embodied as a keyhole weld). FIG. 13 illustrates a student using a slag removal tool to remove slag from the weld 114. Alternatively, the angle grinder may also be used to remove slag from the weld 114. Attachments, such as a braided wire or an abrasive surface, may be added to the finishing tool 122 to improve performance. In either case, the handheld controller 14 may generate haptic feedback 28 corresponding to the application of the finishing tool 122 to the weld 114.

Once the weld 114 has been finished, the system 1 evaluates the weld 114 based on one or more welding assessment criteria 138 to generate a welding assessment 116. The welding assessment criteria 138 may include factors such as speed, accuracy, and arc length. The system 1 then generates and displays visual welding feedback 118 based on the welding assessment 116. Example visual welding feedback 118 is shown in FIG. 14 as a "gold badge" graphic and "LESSON COMPLETE" text. Other types of visual welding feedback 118 may be provided. In further examples, audio feedback may be generated corresponding to the welding assessment 116.

FIG. 15 is a schematic of headset 10. As previously described, the headset 10 includes a processor 18, a tracking system 16, display 12, a microphone 44, and/or an actuator 46. The headset 10 also includes a memory 20. The memory 20 is configured to store a variety of data, such as data collected by aspects of the headset 10 (such as the microphone 44, tracking system 16, etc.) and/or the controllers 14 (see FIG. 2) or generated by the processor 18, via the training software 52, and provided to aspects of the headset 10 (such as the display 12, the audio transducers 42a and 42b, the actuator 46, etc.). For example, the memory 20 may store orientation data 22 collected by the tracking system 16. Further, the memory 20 may store haptic feedback 28 provided to the actuator 46 and/or the handheld controllers 14. The memory 20 may also store various inputs received from the controllers 14 for interacting with the welding training environment 100 (see FIGS. 3-14), such as lesson selection input 54, welding torch engagement input 26, welding machine setting input 36, finishing tool engagement input 30, finishing input 32, and/or guidance mode selection input 34. The memory 20 also stores data regarding the welding training environment 100 itself, such as selectable lessons 102 (including welding process type 104, workpiece type 106, and workpiece position type 120), welding assessment 116, welding assessment criteria 118, guidance mode 126 (including guidance instructions 128), real-time feedback 132, and/or real-time assessment criteria 134.

In some examples, aspects of the headset 10 interact with an LMS 200 (see FIG. 2) to enable features of the virtual welding environment 100, as well as to track the performance and progress of the student. In some cases, the LMS 200 may be a platform such as Canvas®. In a typical scenario, a student operating the headset 10 and controllers 14 downloads the training software 52 from a cloud-based mobile software distribution platform, such as Google Play® or the App Store®. When the processor 18 initially launches the training software 52, the student is prompted to authenticate their identity using LMS credentials 140, such as a username and password. The student may provide their LMS credentials 140 via the controllers 14 (see FIG. 1), microphone 44 (see FIG. 2), and/or any other available inputs. In other examples, the LMS credentials 140 for the student are stored in the memory 20 of the headset 10 and retrieved by the processor 18. In other examples, the LMS credentials 140 may be provided by the institution the student attends. Once the LMS credentials 140 have been transmitted to the LMS 200, allowing the LMS 200 to authenticate the identity of the student, one or more selectable lessons 102 may be made available based on the identity the student. The availability of the selectable lessons 102 may depend on the lesson history and/or competencies of the student. The student may then select one of the available selectable lessons 102. Once completed, the student may elect to submit their welding assessment 116 (including a numerical score) to the LMS 200 via wireless transmission, such as Wi-Fi. If the headset 10 is not connected to a wireless network, the welding assessment 116 may be queued for later submission when connectivity is restored. Once the LMS 200 receives the welding assessment 116, the LMS 200 may store the welding assessment 118. The LMS 200 tracks the incoming welding assessments 118 from multiple students relative to assignments created within the LMS 200. If a student attempts the same lesson multiple times, the LMS 200 can be configured to store either the most recent or the highest welding assessment 116. Additional information can be associated with the welding assessment 116, such as the number of times the student submitted a welding assessment 116, or every welding assessment 116 submitted by the student. The welding assessment 116 may include an overall score, time spent, date/time stamp, or the like.

Figure 16:
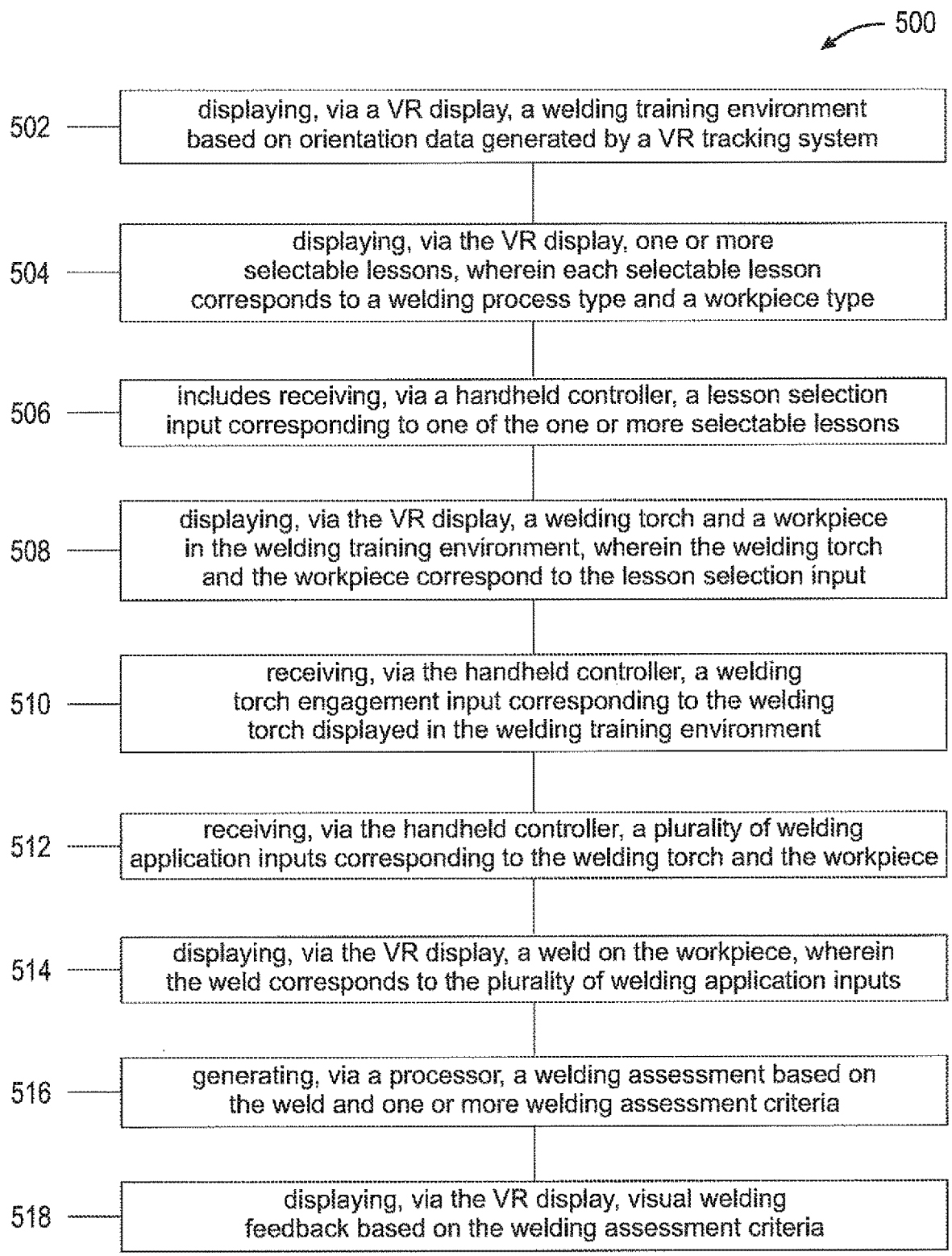
FIG. 16 is a flowchart of a method for providing VR welding training, in accordance with an example.

FIG. 16 illustrates a method 500 for providing VR welding training. The method 500 includes displaying 502, via a VR display, a welding training environment based on orientation data generated by a VR tracking system. The method 500 further includes displaying 504, via the VR display, one or more selectable lessons, wherein each selectable lesson corresponds to a welding process type and a workpiece type. The method 500 further includes receiving 506, via a handheld controller, a lesson selection input corresponding to one of the one or more selectable lessons. The method 500 further includes displaying 508, via the VR display, a welding torch and a workpiece in the welding training environment, wherein the welding torch and the workpiece correspond to the lesson selection input. The method 500 further includes receiving 510, via the handheld controller, a welding torch engagement input corresponding to the welding torch displayed in the welding training environment. The method 500 further includes receiving 512, via the handheld controller, a plurality of welding application inputs corresponding to the welding torch and the workpiece. The method 500 further includes displaying 514, via the VR display, a weld on the workpiece, wherein the weld corresponds to the plurality of welding application inputs. The method 500 further includes generating 516, via a processor, a welding assessment based on the weld and one or more welding assessment criteria. The method 500 further includes displaying 518, via the VR display, visual welding feedback based on the welding assessment criteria.

Textual representations of the guidance instructions 128 for a variety of selectable lessons 102 is provided below. Different aspect of the guidance instructions 128 may be provided depending on the guidance mode 126 selected by the student. The tables below provide example guidance instructions 128 for SMAW (also known as "stick") and TIG welding processes for pipes and stainless steel pipes in a variety of positions. More specifically, Table 1, below, provides guidance instructions 128 for a 2G Tig and Stick Weld for Pipe lesson.

TABLE 1

2G Tig and Stick Weld for Pipe

Introduction:
1. The tig torch is connected to the negative polarity.
2. Be sure the tip of the tungsten electrode is sharp.
3. Use the biggest cup you have that won't pop out of the bevel.
4. Notice that the pipe has no landing.
5. Use argon gas to shield the weld and the tungsten.
6. The gas flow rate is set to 20 CFH.
7. Position yourself so you can see the front of the tungsten rod.
8. Be sure to select "Continue" before starting the first weld.

First Weld - First Root Weld:
1. The amperage has been set to 110 amps.
2. Walk the cup while pushing the puddle around a quarter of the pipe. See the animated guide for your start and end points.
3. Dry run to make sure you can comfortably get to all the angles.
4. Be sure to select "Continue" before moving on to the next bead.

Second weld - Second root weld:
1. Walk the cup while pushing the puddle around a quarter of the pipe. See the animated guide for your start and end points.
2. Dry run to make sure you can comfortably get to all the angles.
3. Be sure to select "Continue" before moving on to the next bead.

Third weld - Third root weld:
1. Walk the cup while pushing the puddle around a quarter of the pipe. See the animated guide for your start and end points.
2. Dry run to make sure you can comfortably get to all the angles.
3. Be sure to select "Continue" before moving on to the next bead.

Fourth weld - Fourth root weld:
1. Walk the cup while pushing the puddle around a quarter of the pipe. See the animated guide for your start and end points.
2. Dry run to make sure you can comfortably get to all the angles.
3. Remove the oxidation with the wire wheel.
4. Be sure to select "Continue" before moving on to the next bead.

Fifth weld - Hot pass weld:
1. The amperage has been turned up to 125 amps.
2. Have the tungsten as close to the root pass as possible without touching it.
3. When you arc up, stay in one place and get a puddle started.
4. Put the tig wire at the top of the root weld.
5. Walk the cup while pushing the puddle around the pipe.
6. Dry run to make sure you can comfortably get to all the angles.
7. Focus on fusing the tig wire and dragging the puddle down while keeping the tig wire at the top.
8. Remove the oxidation with the wire wheel.
9. Be sure to select "Continue" before moving on to the next bead.

Sixth weld - First fill pass with stick welding:
1. The amperage has been set to 85 amps.
2. Take note that the polarity has been reversed.
3. You are now using a 3/32" 7018 electrode.
4. Start on the bottom toe and pull the puddle around the pipe.
5. Dry run to make sure you can comfortably get to all the angles.
6. Focus on getting even coverage over the hot weld and staying above the bottom beveled edge.
7. When you get into a position that you can't reach, get a new electrode and start again in a better position.
8. Start the electrode ahead of the weld and move in towards the previous weld then back around the pipe. It's important to start additional rods before the previous weld cools off.
9. Remove the slag with the wire wheel.
10. Be sure to select "Continue" before moving on to the next bead.

TABLE 1-continued

2G Tig and Stick Weld for Pipe

Seventh weld - Second fill pass with stick welding:
1. Use the top of the first fill pass as your guide.
2. Dry run to make sure you can comfortably get to all the angles.
3. Focus on starting at the top of the first fill pass and forcing the metal up into the top toe.
4. When you get into a position that you can't reach, get a new electrode and start again in a better position.
5. Start the electrode ahead of the weld and move in towards the previous weld then back around the pipe. It's important to start additional rods before the previous weld cools off.
6. Remove the slag with the wire wheel.
7. Be sure to select "Continue" before moving on to the next bead.

Eighth weld - Cap weld:
1. Use the bottom bevel as your guide.
2. Dry run to make sure you can comfortably get to all the angles.
3. Focus on forcing the metal up to the top bevel.
4. When you get into a position that you can't reach, get a new electrode and start again in a better position.
5. Start the electrode ahead of the weld and move in towards the previous weld then back around the pipe. It's important to start additional rods before the previous weld cools off.
6. Remove the slag with the wire wheel.
7. Add more passes if you need.

Be sure to select "Continue" when you are done.

Table 2, below, provides guidance instructions 128 for a 5G Tig and Stick Weld for Pipe lesson.

TABLE 2

5G Tig and Stick Weld for Pipe

Introduction:
1. Take note that the tig torch is connected to the negative polarity.
2. Be sure the tip of the tungsten electrode is sharp.
3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

First weld - First root weld:
1. Your amperage has been set to 110 amps.
2. Start at the bottom of the pipe and work your way up. See the animated guide for your start and end points.
3. Walk the cup while pushing the puddle around to the next tie in.
4. Dry run to make sure you can comfortably get to all the angles.
5. Be sure to select "Continue" before moving on to the next bead.

Second weld - Second root weld:
1. Continue the weld from the side tie in to the top tie in.
2. Walk the cup while taking note of the animated guide for your start and end points.
3. Dry run to make sure you can comfortably get to all the angles.
4. Be sure to select "Continue" before moving on to the next bead.

Third weld - Third root weld:
1. Go back to the bottom of the pipe and work your way up the other side.
2. Dry run to make sure you can comfortably get to all the angles.
3. Be sure to select "Continue" before moving on to the next bead.

Fourth weld - Fourth root weld:
1. Continue the weld from the side tie in to the top tie in.
2. Dry run to make sure you can comfortably get to all the angles.
3. Remove theo xidation with the wire wheel.
4. Be sure to select "Continue" before moving on to the next bead.

Fifth weld - First hot pass weld:
1. Your amperage has been raised to 125 amps.
2. Start at the bottom of the pipe and work your way up.
3. Walk the cup while pushing the puddle around the pipe.
4. Dry run to make sure you can comfortably get to all the angles.
5. Focus on covering the root weld evenly.
6. Be sure to select "Continue" before moving on to the next bead.

Sixth weld - Second hot pass weld:
1. Start at the bottom of the pipe and work your way up the other side.
2. Walk the cup while pushing the puddle around the pipe.
3. Dry run to make sure you can comfortably get to all the angles.
4. Focus on covering the root weld evenly.
5. Remove the oxidation with the wire wheel.

TABLE 2-continued

5G Tig and Stick Weld for Pipe

6. Be sure to select "Continue" before moving on to the next bead.

Seventh weld - First fill pass with stick welding:
1. The amperage has been set to 85 amps.
2. Take note that the polarity has been reversed.
3. You are now using a 3/32" 7018 electrode.
4. Start at the bottom of the pipe and work your way up.
5. Dry run to make sure you can comfortably get to all the angles.
6. Focus on getting even coverage over the hot weld and staying inside the beveled edges.
7. When you get into a position that you can't reach, get a new electrode and start again in a better position.
8. Start the electrode ahead of the weld and move in towards the previous weld then back around the pipe. It's important to start additional rods before the previous weld cools off.
9. Grind down the ends of the weld to tie into it on the other side.
10. Be sure to select "Continue" before moving on to the next bead.

Eighth weld - Second fill pass with stick welding:
1. Be sure to keep the electrode perpendicular to the pipe as you come around.
2. Start at the bottom of the pipe and work your way up.
3. Dry run to make sure you can comfortably get to all the angles.
4. Focus on getting even coverage over the hot weld and staying inside the beveled edges.
5. Remove the slag with the wire wheel.
6. Repeat the fill passes if necessary.
7. Be sure to select "Continue" before moving on to the next bead.

Ninth weld - First cap weld:
1. Start at the bottom of the pipe and work your way up.
2. Dry run to make sure you can comfortably get to all the angles.
3. Focus on getting even coverage over the fill weld and manipulating the puddle just over the beveled edges.
4. When you get into a position that you can't reach, get a new electrode and start again in a better position.
5. Start the electrode ahead of the weld and move in towards the previous weld then back around the pipe. It's important to start additional rods before the previous weld cools off.
6. Grind down the ends of the weld to tie into it on the other side.
7. Be sure to select "Continue" before moving on to the next bead.

Tenth weld - Second cap weld:
1. Start at the bottom of the pipe and work your way up the other side.
2. Dry run to make sure you can comfortably get to all the angles.
3. Focus on getting even coverage over the fill weld and manipulating the puddle just over the beveled edges.
4. Remove the slag with the wire wheel.
5. Be sure to select "Continue" when you are done.

Table 3, below, provides guidance instructions 128 for a 6G Tig and Stick Weld for Pipe lesson.

TABLE 3

6G Tig and Stick Weld for Pipe

Introduction:
1. Take note that the tig torch is connected to the negative polarity.
2. Be sure the tip of the tungsten electrode is sharp.
3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

First weld - First root weld:
1. Your amperage has been set to 110 amps.
2. Walk the cup while taking note of the animated guide for your start and end points.
3. Dry run to make sure you can comfortably get to all the angles.
4. Be sure to select "Continue" before moving on to the next bead.

Second weld - Second root weld:
1. Walk the cup while taking note of the animated guide for your start and end points.
2. Dry run to make sure you can comfortably get to all the angles.
3. Be sure to select "Continue" before moving on to the next bead.

Third weld - Third root weld:
1. Go back to the bottom of the pipe and work your way up the other side.
2. Walk the cup while pushing the puddle around.
3. Dry run to make sure you can comfortably get to all the angles.
4. Be sure to select "Continue" before moving on to the next bead.

TABLE 3-continued

6G Tig and Stick Weld for Pipe

Fourth weld - Fourth root weld:
1. Continue the weld around the pipe.
2. Walk the cup while pushing the puddle.
3. Dry run to make sure you can comfortably get to all the angles.
4. Remove the oxidation with the wire wheel.
5. Be sure to select "Continue" before moving on to the next bead.

Fifth weld - First hot pass weld:
1. The amperage has been turned up to 125 amps.
2. Start at the bottom of the pipe and work your way up.
3. Walk the cup while pushing the puddle around the pipe.
4. Dry run to make sure you can comfortably get to all the angles.
5. Focus on covering the root weld evenly.
6. Be sure to select "Continue" before moving on to the next bead.

Sixth weld - Second hot pass weld:
1. Start at the bottom of the pipe and work your way up the other side.
2. Walk the cup while pushing the puddle around the pipe.
3. Dry run to make sure you can comfortably get to all the angles.
4. Focus on covering the root weld evenly.
5. Remove the oxidation with the wire wheel.
6. Be sure to select "Continue" before moving on to the next bead.

Seventh weld - First fill pass with stick welding:
1. The amperage has been set to 85 amps.
2. You are now using a 3/32" 7018 electrode.
3. The torch polarity has been changed so the stinger is positive.
4. Be sure to keep the electrode perpendicular to the pipe as you come around.
5. Start at the bottom of the pipe and work your way up.
6. Dry run to make sure you can comfortably get to all the angles.
7. Focus on getting even coverage over the hot weld and staying inside the beveled edges.
8. When you get into a position that you can't reach, get a new electrode and start again in a better position.
9. Start the electrode ahead of the weld and move in towards the previous weld then back around the pipe. It's important to start additional rods before the previous weld cools off.
10. Grind down the ends of the weld to tie into it on the other side.
11. Be sure to select "Continue" before moving on to the next bead.

Eighth weld - Second fill pass with stick welding:
1. Start at the bottom of the pipe and work your way up.
2. Dry run to make sure you can comfortably get to all the angles.
3. Focus on getting even coverage over the hot weld and staying inside the beveled edges.
4. When you get into a position that you can't reach, get a new electrode and start again in a better position.
5. Start the electrode ahead of the weld and move in towards the previous weld then back around the pipe. It's important to start additional rods before the previous weld cools off.
6. Remove the slag with the wire wheel.
7. Repeat the fill passes if necessary.
8. Be sure to select "Continue" before moving on to the next bead.

Ninth weld - First cap weld:
1. Start at the bottom of the pipe and work your way up.
2. Dry run to make sure you can comfortably get to all the angles.
3. Focus on getting even coverage over the fill weld and manipulating the puddle just over the beveled edges.
4. When you get into a position that you can't reach, get a new electrode and start again in a better position.
5. Start the electrode ahead of the weld and move in towards the previous weld then back around the pipe. It's important to start additional rods before the previous weld cools off.
6. Grind down the ends of the weld to tie into it on the other side.
7. Be sure to select "Continue" before moving on to the next bead.

Tenth weld - Second cap weld:
1. Start at the bottom of the pipe and work your way up the other side.
2. Dry run to make sure you can comfortably get to all the angles.
3. Remove theslag with the wire wheel.
4. Be sure to select "Continue" when you are done.

Table 4, below, provides guidance instructions 128 for a 2G Tig Weld for Pipe lesson.

TABLE 4

2G Tig Weld for Pipe

Introduction:
1. The tig torch is connected to the negative polarity.
2. Be sure the tip of the tungsten electrode is sharp.
3. Use the biggest cup you have that won't pop out of the bevel.
4. Notice that the pipe has no landing.
5. Use argon gas to shield the weld and the tungsten.
6. The gas flow rate is set to 20 CFH.
7. Position yourself so you can see the front of the tungsten rod.
8. Be sure to select "Continue" before starting the first weld.

TABLE 4-continued

2G Tig Weld for Pipe

First weld - First root weld:
1. The amperage has been set to 85 amps.
2. Walk the cup while taking note of the animated guide for your start and end points.
3. Dry run to make sure you can comfortably get to all the angles.
4. Focus on the tip of the tungsten.
5. Be sure to select "Continue" before moving on to the next bead.
Second weld - Second root weld:
1. Walk the cup while pushing the puddle. See the animated guide for your start and end points.
2. Dry run to make sure you can comfortably get to all the angles.
3. Focus on the tip of the tungsten.
4. Be sure to select "Continue" before moving on to the next bead.
Third weld - Third root weld:
1. Walk the cup while pushing the puddle around.
2. Dry run to make sure you can comfortably get to all the angles.
3. Focus on the tip of the tungsten.
4. Be sure to select "Continue" before moving on to the next bead.
Fourth weld - Fourth root weld:
1. Walk the cup while pushing the puddle around the pipe.
2. Dry run to make sure you can comfortably get to all the angles.
3. Focus on the tip of the tungsten.
4. Remove the oxidation with the wire wheel.
5. Be sure to select "Continue" before moving on to the next bead.
Fifth weld - Hot pass weld:
1. The amperage has been turned up to 100 amps.
2. Have the tungsten as close to the root pass as possible without touching it.
3. When you arc up, stay in one place and get a puddle started.
4. Put the tig wire at the top of the root weld.
5. Walk the cup while pushing the puddle around the pipe.
6. Dry run to make sure you can comfortably get to all the angles.
7. Focus on fusing the tig wire and dragging the puddle down while keeping the tig wire at the top.
8. Remove the oxidation with the wire wheel.
9. Be sure to select "Continue" before moving on to the next bead.
Sixth weld - First fill pass:
1. Walk the cup while taking note of the animated guide for your start and end points.
2. Dry run to make sure you can comfortably get to all the angles.
3. Focus on getting even coverage over the hot weld and staying above the bottom beveled edge.
4. Be sure to select "Continue" before moving on to the next bead.
Seventh weld - Second fill pass:
1. Walk the cup around the other side of the pipe.
2. Dry run to make sure you can comfortably get to all the angles.
3. Focus on getting even coverage over the hot weld and staying above the bottom beveled edge.
4. Remove the oxidation with the wire wheel.
5. Be sure to select "Continue" before moving on to the next bead.
Eighth weld - Cap weld:
1. Use the bottom bevel as your guide.
2. Dry run to make sure you can comfortably get to all the angles.
3. Focus on forcing the metal up to the top bevel.
4. Remove the oxidation with the wire wheel.
5. Add more passes if you need.
6. Be sure to select "Continue" when you are done.

Table 5, below, provides guidance instructions 128 for a 5G Tig Weld for Pipe lesson.

TABLE 5

5G Tig Weld for Pipe

Introduction:
1. Take note that the tig torch is connected to the negative polarity.
2. Be sure the tip of the tungsten electrode is sharp.
3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

TABLE 5-continued

5G Tig Weld for Pipe

First weld - First root weld:
1. Your amperage has been set to 85 amps.
2. Start at the bottom of the pipe and work your way up.
3. Walk the cup while taking note of the animated guide for your start and end points.
4. Dry run to make sure you can comfortably get to all the angles.
5. Be sure to select "Continue" before moving on to the next bead.
Second weld - Second root weld:
1. Continue the weld from the side to the top.
2. Walk the cup while pushing the puddle.
3. Dry run to make sure you can comfortably get to all the angles.
4. Be sure to select "Continue" before moving on to the next bead.
Third weld - Third root weld:
1. Go back to the bottom of the pipe and work your way up the next quarter.
2. Walk the cup while pushing the puddle.
3. Dry run to make sure you can comfortably get to all the angles.
4. Focus on the tip of the tungsten.
5. Be sure to select "Continue" before moving on to the next bead.
Fourth weld - Fourth root weld:
1. Continue the weld from the side to the top.
2. Walk the cup while pushing the puddle.
3. Dry run to make sure you can comfortably get to all the angles.
4. Remove the oxidation with the wire wheel.
5. Be sure to select "Continue" before moving on to the next bead.
Fifth weld - First hot pass weld:
1. Your amperage has been raised to 100 amps.
2. Start at the bottom of the pipe and work your way up.
3. Walk the cup while pushing the puddle around the pipe.
4. Dry run to make sure you can comfortably get to all the angles.
5. Focus on covering the root weld evenly.
6. Be sure to select "Continue" before moving on to the next bead.
Sixth weld - Second hot pass weld:
1. Start at the bottom of the pipe and work your way up the other side.
2. Walk the cup while pushing the puddle around the pipe.
3. Dry run to make sure you can comfortably get to all the angles.
4. Focus on covering the root weld evenly.
5. Remove the oxidation with the wire wheel.
6. Be sure to select "Continue" before moving on to the next bead.
Seventh weld - First fill pass:
1. Start at the bottom of the pipe and work your way up.
2. Dry run to make sure you can comfortably get to all the angles.
3. Focus on getting even coverage over the hot weld and staying inside the beveled edges.
4. Be sure to select "Continue" before moving on to the next bead.
Eighth weld - Second fill pass:
1. Start at the bottom of the pipe and work your way up the other side.
2. Dry run to make sure you can comfortably get to all the angles.
3. Focus on getting even coverage over the hot weld and staying inside the beveled edges.
4. Remove the oxidation with the wire wheel.
5. Be sure to select "Continue" before moving on to the next bead.
Ninth weld - First cap weld:
1. Start at the bottom of the pipe and work your way up.
2. Dry run to make sure you can comfortably get to all the angles.
3. Focus on getting even coverage over the fill weld and manipulating the puddle just over the beveled edges.
4. Be sure to select "Continue" before moving on to the next bead.
Tenth weld - Second cap weld:
1. Start at the bottom of the pipe and work your way up the other side.
2. Dry run to make sure you can comfortably get to all the angles.
3. Focus on getting even coverage over the fill weld and manipulating the puddle just over the beveled edges.
4. Remove the oxidation with the wire wheel.
5. Be sure to select "Continue" when you are done.

Table 6, below, provides guidance instructions 128 for a 6G Tig Weld for Pipe lesson.

TABLE 6

6G Tig Weld for Pipe

Introduction:
1. Take note that the tig torch is connected to the negative polarity.
2. Be sure the tip of the tungsten electrode is sharp.

TABLE 6-continued

6G Tig Weld for Pipe

3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

First weld - First root weld:
1. Your amperage has been set to 85 amps.
2. Start at the bottom of the pipe and work your way up a quarter of the way.
3. Walk the cup while pushing the puddle.
4. Dry run to make sure you can comfortably get to all the angles.
5. Be sure to select "Continue" before moving on to the next bead.

Second weld - Second root weld:
1. Continue the weld from the side to the top.
2. Walk the cup while pushing the puddle.
3. Dry run to make sure you can comfortably get to all the angles.
4. Be sure to select "Continue" before moving on to the next bead.

Third weld - Third root weld:
1. Go back to the bottom of the pipe and work your way up the other side.
2. Walk the cup while pushing the puddle.
3. Dry run to make sure you can comfortably get to all the angles.
4. Be sure to select "Continue" before moving on to the next bead.

Fourth weld - Fourth root weld:
1. Continue the weld from the side to the top.
2. Walk the cup while pushing the puddle.
3. Dry run to make sure you can comfortably get to all the angles.
4. Remove the oxidation with the wire wheel.
5. Be sure to select "Continue" before moving on to the next bead.

Fifth weld - First hot pass weld:
1. The amperage has been turned up to 100 amps.
2. Start at the bottom of the pipe and work your way up.
3. Walk the cup while pushing the puddle around the pipe.
4. Dry run to make sure you can comfortably get to all the angles.
5. Focus on covering the root weld evenly.
6. Be sure to select "Continue" before moving on to the next bead.

Sixth weld - Second hot pass weld:
1. Start at the bottom of the pipe and work your way up the other side.
2. Walk the cup while pushing the puddle around the pipe.
3. Dry run to make sure you can comfortably get to all the angles.
4. Focus on covering the root weld evenly.
5. Remove the oxidation with the wire wheel.
6. Be sure to select "Continue" before moving on to the next bead.

Seventh weld - First fill pass:
1. Start at the bottom of the pipe and work your way up.
2. Dry run to make sure you can comfortably get to all the angles.
3. Focus on getting even coverage over the hot weld and staying inside the beveled edges.
4. Be sure to select "Continue" before moving on to the next bead.

Eighth weld - Second fill pass:
1. Start at the bottom of the pipe and work your way up the other side.
2. Dry run to make sure you can comfortably get to all the angles.
3. Focus on getting even coverage over the hot weld and staying inside the beveled edges.
4. Remove the oxidation with the wire wheel.
5. Repeat the fill passes if necessary.
6. Be sure to select "Continue" before moving on to the next bead.

Ninth weld - First cap weld:
1. Start at the bottom of the pipe and work your way up.
2. Dry run to make sure you can comfortably get to all the angles.
3. Focus on getting even coverage over the fill weld and manipulating the puddle just over the beveled edges.
4. Be sure to select "Continue" before moving on to the next bead.

Tenth weld - Second cap weld:
1. Start at the bottom of the pipe and work your way up the other side.
2. Dry run to make sure you can comfortably get to all the angles.
3. Remove the oxidation with the wire wheel.
4. Be sure to select "Continue" when you are done.

Table 7, below, provides guidance instructions 128 for a 2G Tig Weld for Stainless Steel Pipe lesson.

TABLE 7

2G Tig Weld for Stainless Steel Pipe

Introduction:
1. Take note that the tig torch is connected to the negative polarity.
2. Be sure the tip of the tungsten electrode is sharp.
3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

First weld - First root weld:
1. Notice for all the root passes a purge system has been setup for you to protect the backside of the root weld from oxidation.
2. Be sure to drip the rod into the gap rather than running the wire over it.
3. The amperage has been set to 85 amps.
4. Start at the bottom of the pipe and work upwards a quarter of the way.
5. Dry run to make sure you can comfortably get to all the angles.
6. Be sure to select "Continue" before moving on to the next bead.

Second weld - Second root weld:
1. Continue from the end of the last bead to the top of the pipe.
2. Dry run to make sure you can comfortably get to all the angles.
3. Focus on the puddle melting the rod, not the arc. Drip and spread.
4. Be sure to select "Continue" before moving on to the next bead.

Third weld - Third root weld:
1 Go back to the bottom of the pipe and work your way up the next quarter.
2 Dry run to make sure you can comfortably get to all the angles.
3 Focus on the puddle melting the rod, not the arc. Drip and spread.
4. Be sure to select "Continue" before moving on to the next bead.

Fourth weld - Fourth root weld:
1. Finish up your way around the pipe.
2. Dry run to make sure you can comfortably get to all the angles.
3. Focus on the puddle melting the rod, not the arc. Drip and spread.
4. Prepare for the fill pass weld by grinding down the root pass slightly.
5. Remove the oxidation with the wire wheel.
6. Be sure to select "Continue" before moving on to the next bead.

Fifth weld - Bottom fill weld:
1. The amperage has been turned up to 100 amps.
2. Have the tungsten as close to the root pass as possible without touching it.
3. When you arc up, stay in one place and get a puddle started.
4. Put the tig wire at the top of the root weld.
5. Walk the cup while pushing the puddle around the pipe.
6. Dry run to make sure you can comfortably get to all the angles.
7. Focus on fusing the tig wire and dragging the puddle down while keeping the tig wire at the top.
8. Be sure to select "Continue" before moving on to the next bead.

Sixth weld - Top fill weld:
1. Put the tig wire at the top of the root weld.
2. Walk the cup while pushing the puddle around the pipe.
3. Dry run to make sure you can comfortably get to all the angles.
4. Focus on fusing the tig wire and dragging the puddle down while keeping the tig wire at the top.
5. Prepare for the next weld with the grinder slightly.
6. Remove the oxidation with the wire wheel.
7. Be sure to select "Continue" before moving on to the next bead.

Seventh weld - Bottom cap weld:
1. Use the bottom bevel as your guide.
2. When you arc up, stay in one place and get a puddle started.
3. Walk the cup while pushing the puddle around the pipe.
4. Dry run to make sure you can comfortably get to all the angles.
5. Focus on fusing the tig wire and dragging the puddle down while keeping the tig wire at the top.
6. Prepare for the next weld with the grinder.
7. Remove the oxidation with the wire wheel.
8. Be sure to select "Continue" before moving on to the next bead.

Eighth weld - Top cap weld:
1. Use the top bevel as your guide.
2. When you are up, stay in one place and get a puddle started.
3. Walk the cup while pushing the puddle around the pipe.
4. Dry run to make sure you can comfortably get to all the angles.
5. Focus on fusing the tig wire and dragging the puddle down while keeping the tig wire at the top.
6. Be sure to select "Continue" when you are done.

Table 8, below, provides guidance instructions 128 for a 5G Tig Weld for Stainless Steel Pipe lesson.

TABLE 8

5G Tig Weld for Stainless Steel Pipe

Introduction:
1. Take note that the tig torch is connected to the negative polarity.
2. Be sure the tip of the tungsten electrode is sharp.
3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

First weld - First root weld:
1. Notice for all the root passes a purge system has been setup for you to protect the backside of the root weld from oxidation.
2. Be sure to drip the rod into the gap rather than running the wire over it.
3. The amperage has been set to 85 amps.
4. Start at the bottom of the pipe and work upwards a quarter of the way.
5. Dry run to make sure you can comfortably get to all the angles.
6. Be sure to select "Continue" before moving on to the next bead.

Second weld - Second root weld:
1. Walk the cup while pushing the puddle around the next quarter.
2. Dry run to make sure you can comfortably get to all the angles.
3. Focus on the puddle melting the rod, not the arc. Drip and spread.
4. Be sure to select "Continue" before moving on to the next bead.

Third weld - Third root weld:
1. Walk the cup while pushing the puddle around the next quarter.
2. Dry run to make sure you can comfortably get to all the angles.
3. Focus on the puddle melting the rod, not the arc. Drip and spread.
4. Be sure to select "Continue" before moving on to the next bead.

Fourth weld - Fourth root weld:
1. Walk the cup while pushing the puddle around the last quarter.
2. Dry run to make sure you can comfortably get to all the angles.
3. Focus on the puddle melting the rod, not the arc. Drip and spread.
4. Prepare the root weld for the hot pass weld by grinding it down.
5. Prepare for the fill pass weld by grinding down the root pass slightly.
6. Remove the oxidation with the wire wheel.
7. Be sure to select "Continue" before moving on to the next bead.

Fifth weld - Bottom fill weld:
1. The amperage has been turned up to 100 amps.
2. Have the tungsten as close to the root pass as possible without touching it.
3. When you arc up, stay in one place and get a puddle started.
4. Put the tig wire at the top of the root weld.
5. Walk the cup while pushing the puddle around the pipe.
6. Dry run to make sure you can comfortably get to all the angles.
7. Focus on fusing the tig wire and dragging the puddle down while keeping the tig wire at the top.
8. Be sure to select "Continue" before moving on to the next bead.

Sixth weld - Top fill weld:
1. Put the tig wire at the top of the root weld.
2. Walk the cup while pushing the puddle around the pipe.
3. Dry run to make sure you can comfortably get to all the angles.
4. Focus on fusing the tig wire and dragging the puddle down while keeping the tig wire at the top.
5. Prepare for the next weld with the grinder slightly.
6. Remove the oxidation with the wire wheel.
7. Be sure to select "Continue" before moving on to the next bead.

Seventh weld - Bottom cap weld:
1. Use the bottom bevel as your guide.
2 When you arc up, stay in one place and get a puddle started.
3 Walk the cup while pushing the puddle around the pipe.
4. Dry run to make sure you can comfortably get to all the angles.
5. Focus on fusing the tig wire and dragging the puddle down while keeping the tig wire at the top.
6. Prepare for the next weld with the grinder slightly.
7. Remove the oxidation with the wire wheel.
8. Be sure to select "Continue" before moving on to the next bead.

Eighth weld - Top cap weld:
1. Use the top bevel as your guide.
2. When you arc up, stay in one place and get a puddle started.
3. Walk the cup while pushing the puddle around the pipe.
4. Dry run to make sure you can comfortably get to all the angles.
5. Focus on fusing the tig wire and dragging the puddle down while keeping the tig wire at the top.
6. Be sure to select "Continue" when you are done.

Table 9, below, provides guidance instructions 128 for a 6G Tig Weld for Stainless Steel Pipe lesson.

TABLE 9

6G Tig Weld for Stainless Steel Pipe

Introduction:
1. Take note that the tig torch is connected to the negative polarity.
2. Be sure the tip of the tungsten electrode is sharp.
3. Use the biggest cup you have that won't pop out of the bevel.
4. Notice that the pipe has no landing.
5. You will be using argon gas to shield the weld and the tungsten.
6. The gas flow rate is set to 20 CFH.
7. Position yourself so you can see the front of the tungsten rod.
8. Be sure to select "Continue" before starting the first weld.

First weld - First root weld:
1. Notice for all the root passes a purge system has been setup for you to protect the backside of the root weld from oxidation.
2. Be sure to drip the rod into the gap rather than running the wire over it.
3. The amperage has been set to 85 amps.
4. Start at the bottom of the pipe and work upwards a quarter of the way.
5. Dry run to make sure you can comfortably get to all the angles.
6. Be sure to select "Continue" before moving on to the next bead.

Second weld - Second root weld:
1. Walk the cup while pushing the puddle around the next quarter.
2. Dry run to make sure you can comfortably get to all the angles.
3. Focus on the puddle melting the rod, not the arc. Drip and spread.
4. Be sure to select "Continue" before moving on to the next bead.

Third weld - Third root weld:
1. Walk the cup while pushing the puddle around the next quarter.
2. Dry run to make sure you can comfortably get to all the angles.
3. Focus on the puddle melting the rod, not the arc. Drip and spread.
4. Be sure to select "Continue" before moving on to the next bead.

Fourth weld - Fourth root weld:
1. Walk the cup while pushing the puddle around the last quarter.
2. Dry run to make sure you can comfortably get to all the angles.
3. Focus on the puddle melting the rod, not the arc. Drip and spread.
4. Prepare for the fill pass weld by grinding down the root pass slightly.
5. Remove the oxidation with the wire wheel.
6. Be sure to select "Continue" before moving on to the next bead.

Fifth weld - Bottom fill weld:
1. The amperage has been turned up to 100 amps.
2. Have the tungsten as close to the root pass as possible without touching it.
3. When you arc up, stay in one place and get a puddle started.
4. Put the tig wire at the top of the root weld.
5. Walk the cup while pushing the puddle around the pipe.
6. Dry run to make sure you can comfortably get to all the angles.
7. Focus on fusing the tig wire and dragging the puddle down while keeping the tig wire at the top.
8. Prepare for the next weld with the grinder slightly.
9. Remove the oxidation with the wire wheel.
10. Be sure to select "Continue" before moving on to the next bead.

Sixth weld - Top fill weld:
1. Put the tig wire at the top of the root weld.
2. Walk the cup while pushing the puddle around the pipe.
3. Dry run to make sure you can comfortably get to all the angles.
4. Focus on fusing the tig wire and dragging the puddle down while keeping the tig wire at the top.
5. Prepare for the next weld with the grinder slightly.
6. Remove the oxidation with the wire wheel.
7. Be sure to select "Continue" before moving on to the next bead.

Seventh weld - Bottom cap weld:
1. Use the bottom bevel as your guide.
2. When you arc up, stay in one place and get a puddle started.
3. Walk the cup while pushing the puddle around the pipe.
4. Dry run to make sure you can comfortably get to all the angles.
5. Focus on fusing the tig wire and dragging the puddle down while keeping the tig wire at the top.
6. Prepare for the next weld with the grinder slightly.
7. Remove the oxidation with the wire wheel.
8. Be sure to select "Continue" before moving on to the next bead.

Eighth weld - Top cap weld:
1. Use the top bevel as your guide.
2. When you arc up, stay in one place and get a puddle started.
3. Walk the cup while pushing the puddle around the pipe.
4. Dry run to make sure you can comfortably get to all the angles.
5. Focus on fusing the tig wire and dragging the puddle down while keeping the tig wire at the top.

TABLE 9-continued

6G Tig Weld for Stainless Steel Pipe

6. Remove the oxidation with the wire wheel.
7. Be sure to select "Continue" when you are done.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A virtual reality (VR) welding training system comprising a VR display, a handheld controller, a VR tracking system, and a processor, wherein the processor is configured to:

display, via the VR display, a virtual welding training environment based on orientation data generated by the VR tracking system;

display, via the VR display, one or more selectable lessons, wherein each selectable lesson corresponds to a welding process type and a workpiece type;

receive, via the handheld controller, a lesson selection input corresponding to one of the one or more selectable lessons;

display, via the VR display, a welding torch and a workpiece in the virtual welding training environment, wherein the welding torch and the workpiece correspond to the lesson selection input;

receive, via the handheld controller, a welding torch engagement input corresponding to the welding torch displayed in the welding training environment, wherein the welding torch engagement input enables the handheld controller to manipulate the welding torch in the virtual welding training environment;

receive, via the handheld controller, a plurality of welding application inputs corresponding to the welding torch and the workpiece;

display, via the VR display, a weld on the workpiece, wherein the weld corresponds to the plurality of welding application inputs;

generate a welding assessment based on the weld and one or more welding assessment criteria; and display, via the VR display, visual welding feedback based on the welding assessment criteria.

2. The VR welding training system of claim 1, wherein each selectable lesson further comprises a workpiece position type.

3. The VR welding training system of claim 2, wherein the workpiece position type is one of flat, horizontal, vertical, overhead, forty-five degree, and diagonal.

4. The VR welding training system of claim 2, wherein the workpiece is displayed according to the workpiece position type corresponding to the lesson selection input.

5. The VR welding training system of claim 1, wherein the VR tracking system comprises a gyroscope and/or an accelerometer.

6. The VR welding training system of claim 1, wherein the processor is further configured to provide, via the handheld controller, haptic feedback based on the plurality of welding application inputs and the workpiece.

7. The VR welding training system of claim 1, wherein the processor is further configured to:
　display, via the VR display, a finishing tool in the virtual welding training environment, wherein the finishing tool corresponds to the lesson selection input;
　receive, via the handheld controller, a finishing tool engagement input corresponding to the finishing tool displayed in the virtual welding training environment;
　receive, via the handheld controller, a plurality of finishing inputs corresponding to the finishing tool and the weld; and
　display, via the VR display, a finished weld on the workpiece, wherein the finished weld corresponds to the plurality of finishing inputs.

8. The VR welding training system of claim 7, wherein the processor is further configured to provide, via the handheld controller, haptic feedback based on the plurality of finishing inputs and the weld.

9. The VR welding training system of claim 7, wherein the finishing tool is one of an angle grinder, angle grinder with braided wire, angle grinder with abrasive attachment.

10. The VR welding training system of claim 7, wherein the finishing tool is a slag removal tool.

11. The VR welding training system of claim 1, wherein the workpiece type is one of t-plate, grooved plate, and pipe.

12. The VR welding training system of claim 1, wherein the welding process type is one of shielded metal arc welding (SMAW), tungsten inert gas (TIG), and metal inert gas (MIG).

13. The VR welding training system of claim 1, wherein the processor is further configured to:
　display, via the VR display, one or more guidance modes; and
　receive, via the handheld controller, a guidance mode selection input corresponding to one of the one or more guidance modes.

14. The VR welding system of claim 13, wherein the guidance modes comprise at least one of guided, semi-guided, and unguided.

15. The VR welding system of claim 13, wherein the processor is further configured to display one or more guidance instructions based on the lesson selection input and the guidance selection input.

16. The VR welding system of claim 13, wherein the processor is further configured to display a guidance animation based on the lesson selection input and the guidance selection input.

17. The VR welding system of claim 1, wherein the processor is further configured to generate a real-time feedback based on the plurality of welding application inputs and one or more real-time assessment criteria.

18. The VR welding system of claim 17, wherein the real-time feedback is audio-visual.

19. The VR welding system of claim 17, wherein the real-time assessment criteria includes at least one of speed and arc length.

20. The VR welding system of claim 1, wherein the processor is further configured to:
　determine one or more welding machine settings based on the lesson selection input; and display, via the VR display, at least one of the one or more welding machine settings.

21. The VR welding system of claim 20, wherein the weld further corresponds to the one or more welding machine settings.

22. The VR welding system of claim 20, wherein the one or more welding machine settings include at least one of wire speed, voltage, and current.

23. The VR welding system of claim 20, wherein the processor is further configured to:
　receive, via the handheld controller, a welding machine setting input;
　update, via the processor, at least one of the one or more welding machine settings based on the welding machine input.

24. The VR welding system of claim 20, wherein the at least one of the one or more welding machine settings are displayed on a welding machine.

25. The VR welding system of claim 1, wherein the processor is further configured to provide credentials to a learning management system (LMS).

26. The VR welding system of claim 25, wherein the processor is further configured to retrieve the one or more selectable lessons from the LMS based on the credentials.

27. The VR welding system of claim 25, wherein the processor is further configured to transmit the welding assessment to the LMS.

28. The VR welding system of claim 27, wherein the transmitted welding assessment is associated with the credentials.

29. The VR welding system of claim 25, wherein the processor is further configured to receive the credentials via the handheld controller and/or a microphone.

30. The VR welding system of claim 25, wherein the processor is further configured to retrieve the credentials from a memory.

31. A method for providing virtual reality (VR) welding training, comprising:
　displaying, via a VR display, a virtual welding training environment based on orientation data generated by a VR tracking system;
　displaying, via the VR display, one or more selectable lessons, wherein each selectable lesson corresponds to a welding process type and a workpiece type;
　receiving, via a handheld controller, a lesson selection input corresponding to one of the one or more selectable lessons;
　displaying, via the VR display, a welding torch and a workpiece in the virtual welding training environment, wherein the welding torch and the workpiece correspond to the lesson selection input;
　receiving, via the handheld controller, a welding torch engagement input corresponding to the welding torch displayed in the virtual welding training environment, wherein the welding torch engagement input enables the handheld controller to manipulate the welding torch in the virtual welding training environment;
　receiving, via the handheld controller, a plurality of welding application inputs corresponding to the welding torch and the workpiece;
　displaying, via the VR display, a weld on the workpiece, wherein the weld corresponds to the plurality of welding application inputs;

generating, via a processor, a welding assessment based on the weld and one or more welding assessment criteria; and displaying, via the VR display, visual welding feedback based on the welding assessment criteria.

* * * * *